(12) United States Patent
Schroeder et al.

(10) Patent No.: US 8,452,151 B2
(45) Date of Patent: May 28, 2013

(54) CABLE RETAINER ASSEMBLY AND METHOD FOR POSITIONING THE SAME

(75) Inventors: Michael D. Schroeder, Webster, MN (US); Mark Smrha, La Grange Park, IL (US)

(73) Assignee: ADC Telecommunications, Inc., Berwyn, PA (US)

( * ) Notice: Subject to any disclaimer, the term of this patent is extended or adjusted under 35 U.S.C. 154(b) by 651 days.

(21) Appl. No.: 12/687,654

(22) Filed: Jan. 14, 2010

(65) Prior Publication Data

US 2010/0178022 A1 Jul. 15, 2010

Related U.S. Application Data

(60) Provisional application No. 61/144,585, filed on Jan. 14, 2009.

(51) Int. Cl.
*G02B 6/36* (2006.01)
*H02G 15/08* (2006.01)
*H02G 3/18* (2006.01)

(52) U.S. Cl.
USPC ............... 385/137; 385/86; 174/79; 174/660

(58) Field of Classification Search
USPC ................................ 385/86, 137; 174/79, 660
See application file for complete search history.

(56) References Cited

U.S. PATENT DOCUMENTS

| 3,946,467 | A | * | 3/1976 | Lukas et al. ................... 24/537 |
| 4,355,920 | A | | 10/1982 | Graham |
| 5,745,633 | A | | 4/1998 | Giebel et al. |
| 6,395,985 | B1 | | 5/2002 | Djeddah |
| 6,427,046 | B1 | | 7/2002 | Bickford et al. |
| 6,953,287 | B2 | | 10/2005 | Cox |
| 7,132,605 | B2 | | 11/2006 | Holmberg et al. |
| 7,273,985 | B2 | | 9/2007 | Holmberg et al. |
| 2009/0159332 | A1 | | 6/2009 | Holmberg et al. |

OTHER PUBLICATIONS

Tyco Electronics, Fiber Optic Simplex Plug, 2005, 2 Pages.

\* cited by examiner

*Primary Examiner* — Jerry Rahll
(74) *Attorney, Agent, or Firm* — Merchant & Gould P.C.

(57) ABSTRACT

A cable retainer assembly comprising a cable retainer and a cable retainer bracket for retaining a cable to a fixed location. The cable retainer is positioned on an arbitrary portion of the cable and then secured to a cable retainer assembly such that one or more cables can be secured and organized.

15 Claims, 33 Drawing Sheets

CABLE RETAINER ASSEMBLY AND METHOD FOR POSITIONING THE SAME

CROSS REFERENCE TO RELATED APPLICATIONS

This application claims the benefit of provisional application Ser. No. 61/144,585, filed Jan. 14, 2009, which is incorporated herein by reference in its entirety.

BACKGROUND

The present disclosure relates to cable retainer assemblies and methods for retaining a cable to a fixed location. Cable retainer assemblies are used in situations that require cable management for one or more cables. For example, various industries (e.g., telecommunications) have found cable retainer assemblies desirable in applications where cables benefit from being organized and restricted from interfering with each other as installation or maintenance is being performed.

One concern with current cable retainer assemblies relates to cables having one or more ends pre-terminated with connectors. Typically, extra work is required to decouple the cable, engage the cable retainer assembly and then reconnect the cable. Further, it can be difficult to locate an ideal location to position a cable retainer assembly.

For these and other reasons cable retainer assemblies are desired such that cables can be efficiently organized and secured.

SUMMARY

In a first aspect, a first example cable retainer assembly is provided. The first cable retainer assembly includes a holder, and a cable retainer. In the example embodiment, the cable retainer comprises a female coupling having a body having a generally cylindrical shape about a first longitudinal axis, and a male coupling having a body having a generally cylindrical shape about a second longitudinal axis.

In one embodiment, the female coupling and the male coupling are engaged on a section of cable in near proximity to each other such that a second end of the body of the male coupling is inserted into a first end of the body of the female coupling. In this manner, upon insertion, distal ends of the projections on the male couple are movable radially inward as the projections move along an internal surface of the body of the female coupling as the end of the body of the male coupling is moved toward the second end of the body of the female coupling to form a mated cable retainer secured to the cable.

Subsequently, the mated cable retainer is positioned to the holder. In general, the holder includes a slotted edge, wherein the slotted edge is received in a notch of the external surface of the body of the female coupling when the mated cable retainer is moved relative to the holder in a direction transverse to the first longitudinal axis. Upon placement of the mated cable retainer to the holder, a closure member is mounted to the holder to retain the mated cable retainer with the holder to form an assembled cable retainer assembly.

In a second aspect, a second example cable retainer assembly is provided. The second cable retainer assembly includes a holder, and a male coupling. In the example embodiment, the holder includes a plurality of integrally formed female couplings. Each of the plurality of female couplings extends from a first end opening adjacent to a first surface of the holder to an opposite, second end opening. Each respective female coupling passage further includes a side slot extending longitudinally from the first end opening to the opposite second end opening and facing outwards and away from the body of the holder.

In one embodiment, the male coupling is coupled to a section of cable. A portion of cable adjacent to a second end of the body of the male coupling is inserted into a passage of the female coupling. Subsequently, the second end of the male coupling is inserted into the first end opening of a respective female coupling. Upon insertion, distal ends of projections on the male coupling are movable radially inward as the projections move along an internal surface defined by the passage of the body of the female coupling. As the end of the body of the male coupling is moved toward the second end opening of the body of the female coupling a mated cable retainer, and an assembled cable retainer assembly, is formed.

In general, in the context of both the first and second aspects described throughout, an assembled cable retainer assembly can be positioned and/or secured to any desirable structure, such as a bulkhead. In this manner, on or more cables can be restrained and organized such that work can be performed on any desirable section of cable. Further, the cable retainer and the cable retaining assembly according to the principles of the present disclosure can be a permanent or temporary cable management solution.

DESCRIPTION OF THE DRAWINGS

Aspects of the present disclosure may be more completely understood in consideration of the following detailed description of various embodiments in connection with the accompanying drawings, in which.

DETAILED DESCRIPTION

The example embodiments described in the following disclosure are provided by way of illustration only and should not be construed as limiting. Various modifications and changes may be made to the example embodiments described below without departing from the true spirit and scope of the disclosure.

The present disclosure relates to cable retainment assemblies and methods for restraining a cable to a fixed location.

Referring now to FIGS. 1-8, a first example system 100 demonstrating a first example cable retainer assembly according to the principles of the present disclosure is shown. The system 100 includes a female coupling 105 and male coupling 110. As depicted, the female coupling 105 can be positioned on a section of a cable 115 as a movable sleeve fitting such that an inner diameter of a passage defined through the body of the female coupling 105 radially engages the cable 115 along a cable longitudinal axis N. The cable 115 of the present disclosure can be a single cable or a bundle of cables, and can be any type or variation of cable, such as a fiber optic cable, an electric conductor, or other cable.

The male coupling 110 is shown orientated with respect to the longitudinal axis N such that an inner diameter of a passage defined through the body of the male coupling 110 radially engages the cable 115 along the cable longitudinal axis N. The male coupling 110 can then be movable along a length of the cable 115 such that a complementary feature of the male coupling 110 is pressed into the passage of the female coupling 105 to form a mated cable retainer. In this manner, a radial clamping force is actuated onto the cable 115, thereby securing the mated cable retainer to an arbitrary section of the cable 115.

Figure 1:
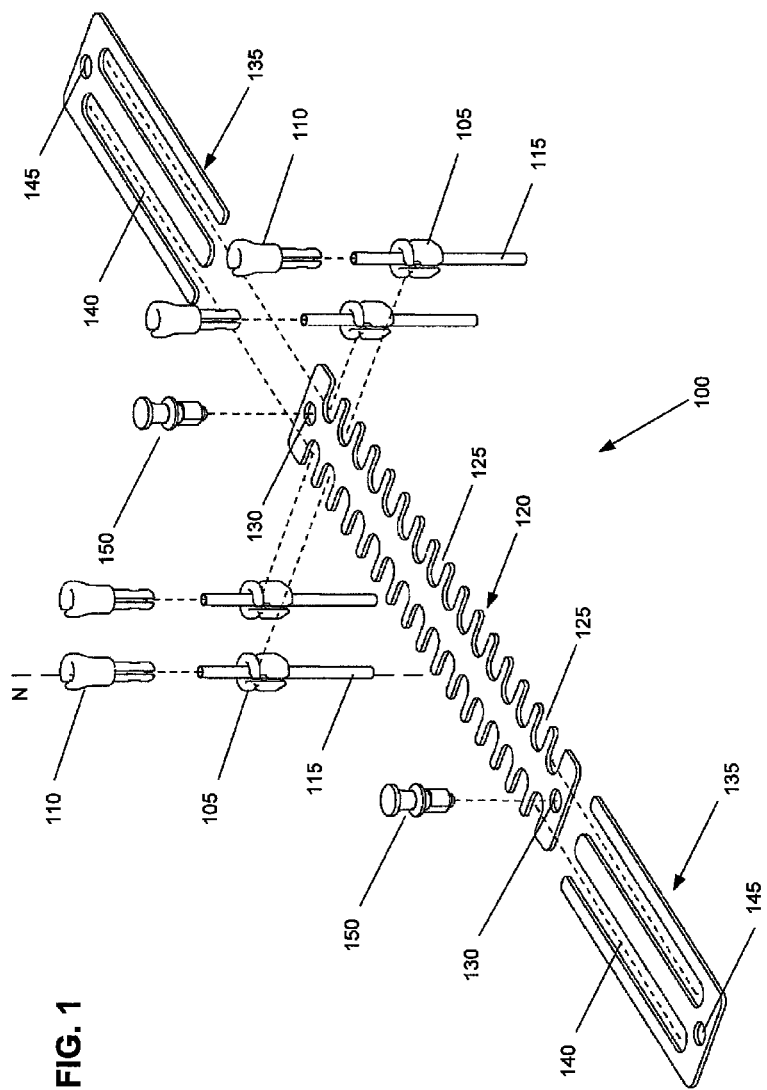
FIG. 1 is an exploded perspective view of a first example cable retainer assembly.
Figure 2:
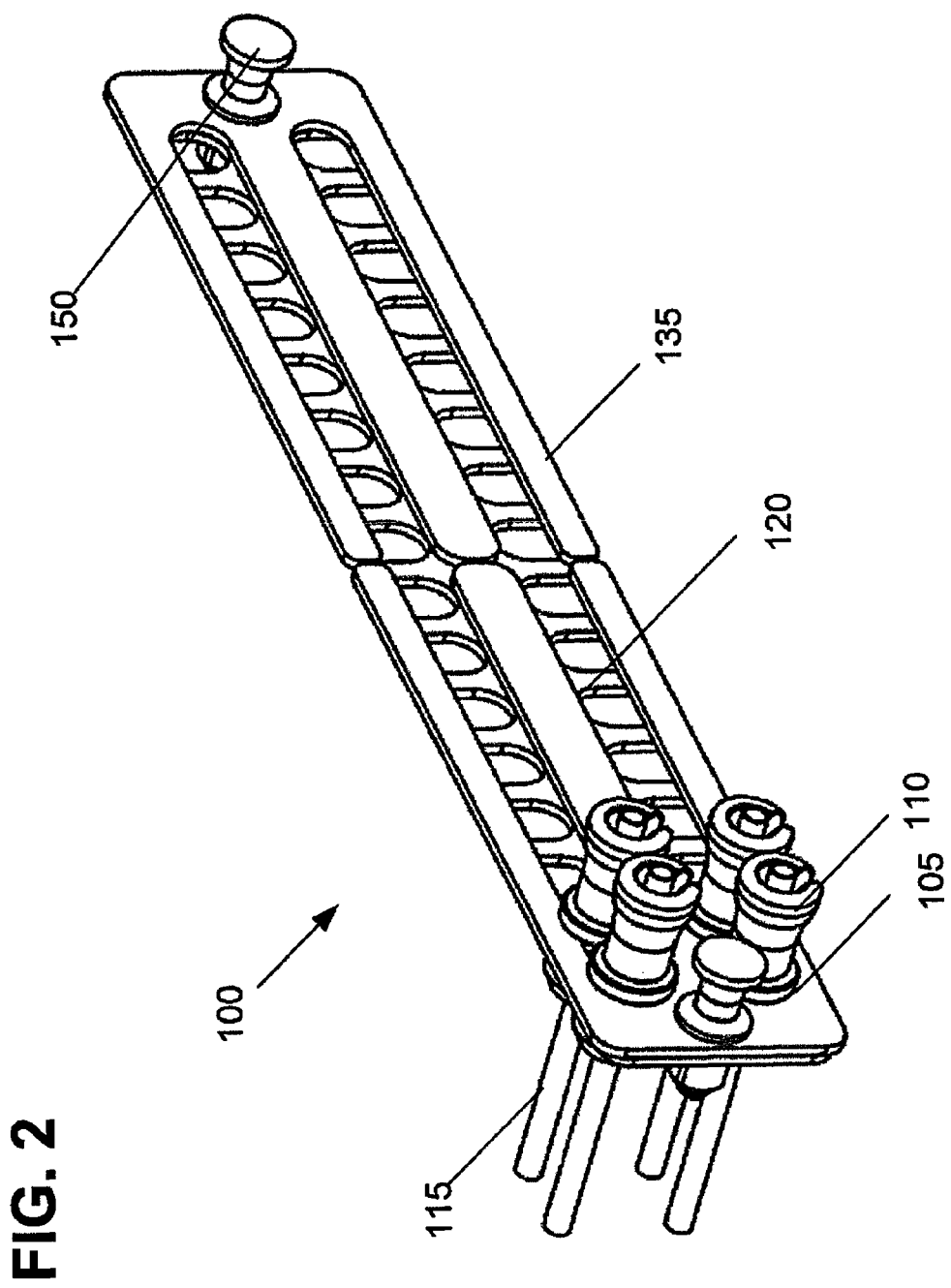
FIG. 2 is a perspective view of an assembled first example cable retainer assembly.
Figure 3:
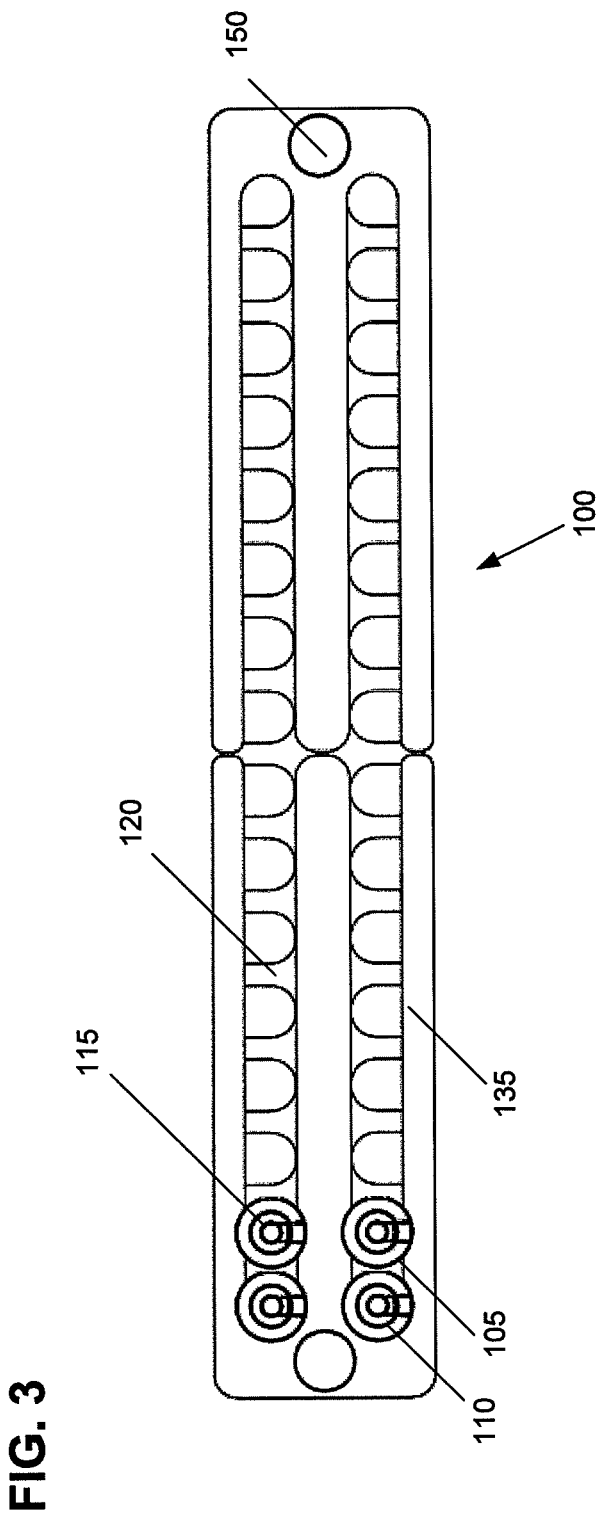
FIG. 3 is a front view of the assembled cable retainer assembly of FIG. 2.
Figure 4:
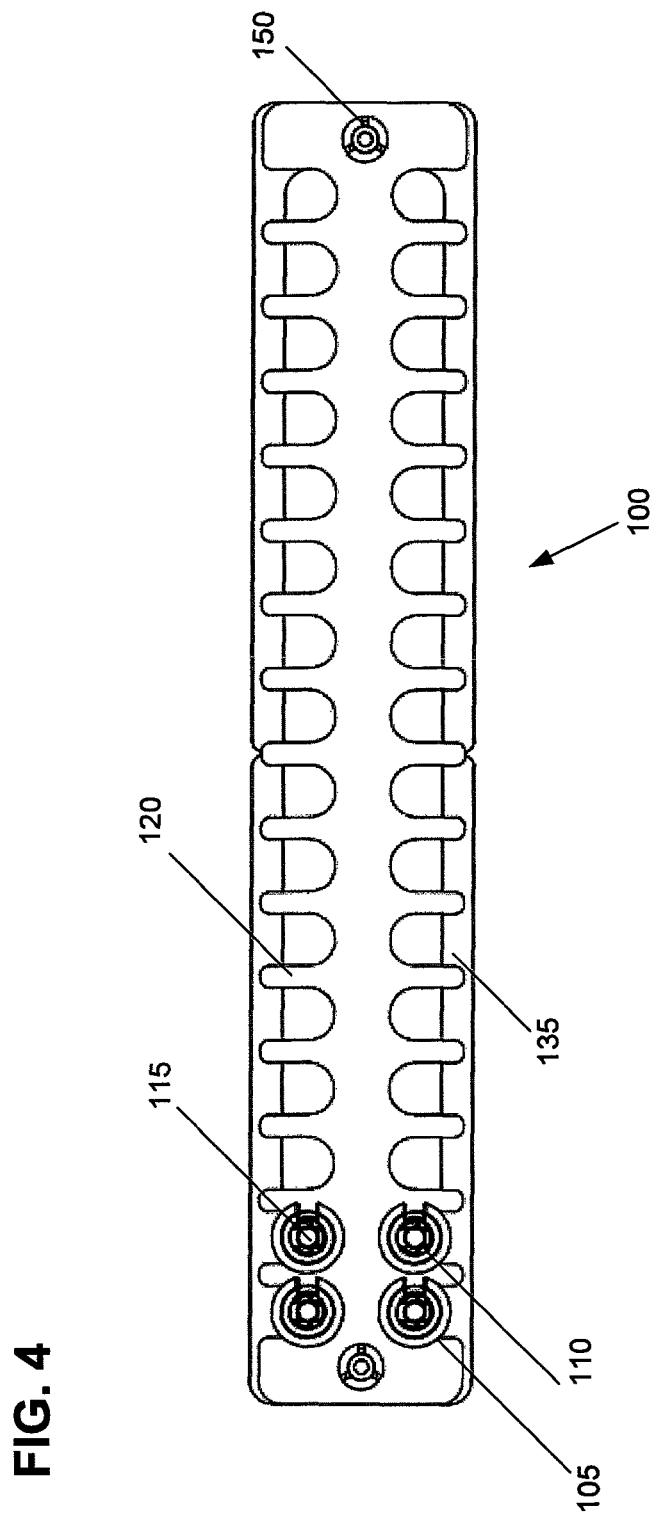
FIG. 4 is a rear view of the assembled cable retainer assembly of FIG. 2.
Figure 5:
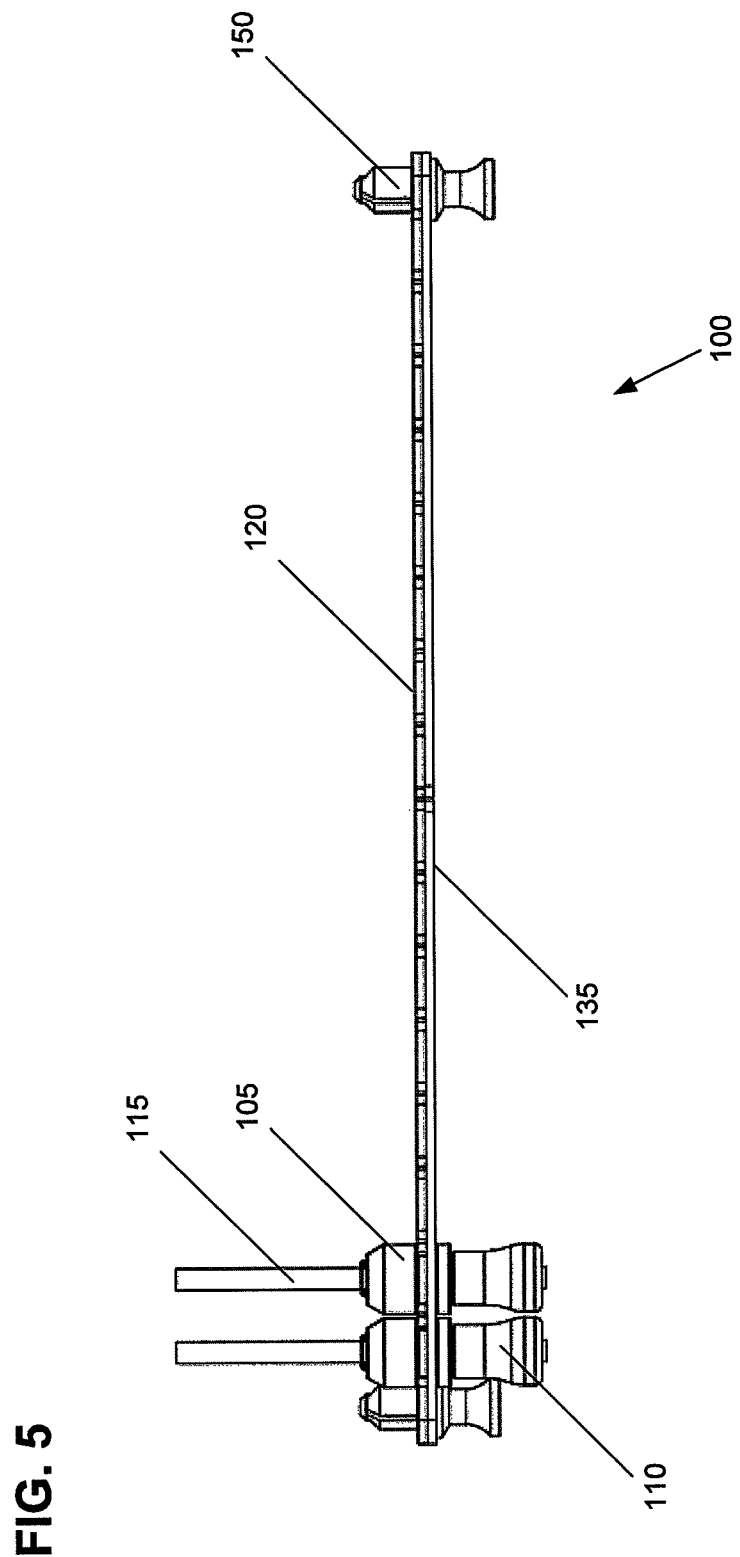
FIG. 5 is a side view of the assembled cable retainer assembly of FIG. 2.
Figure 6:
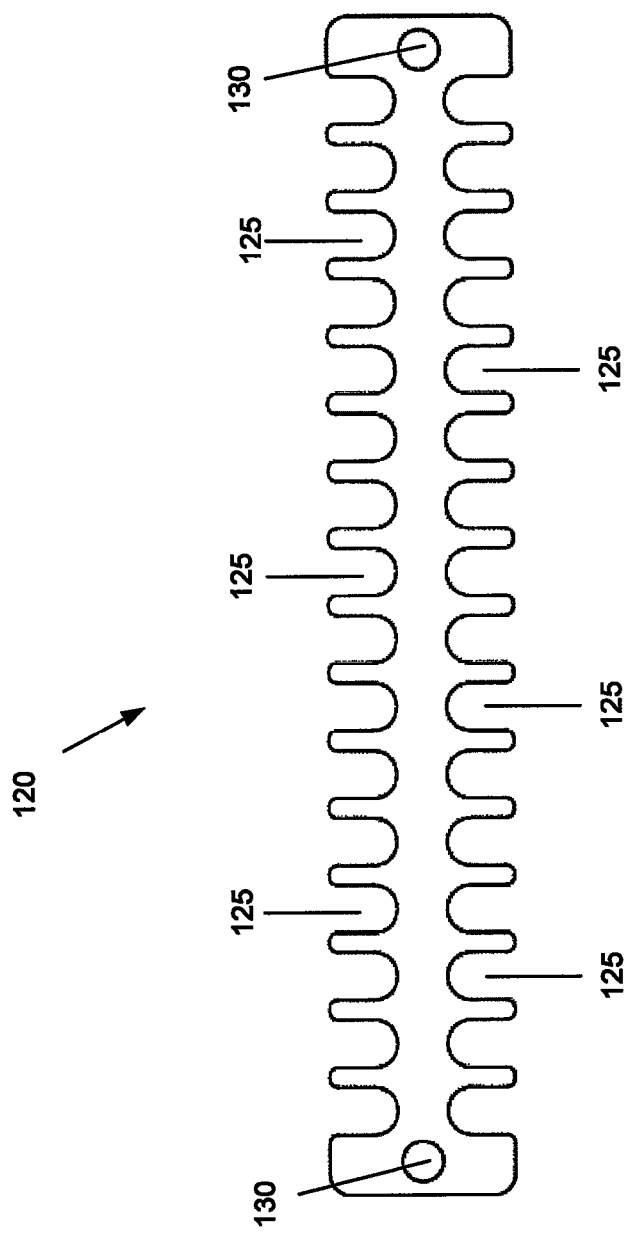
FIG. 6 is a front view of the holder as shown in FIG. 1.
Figure 7:
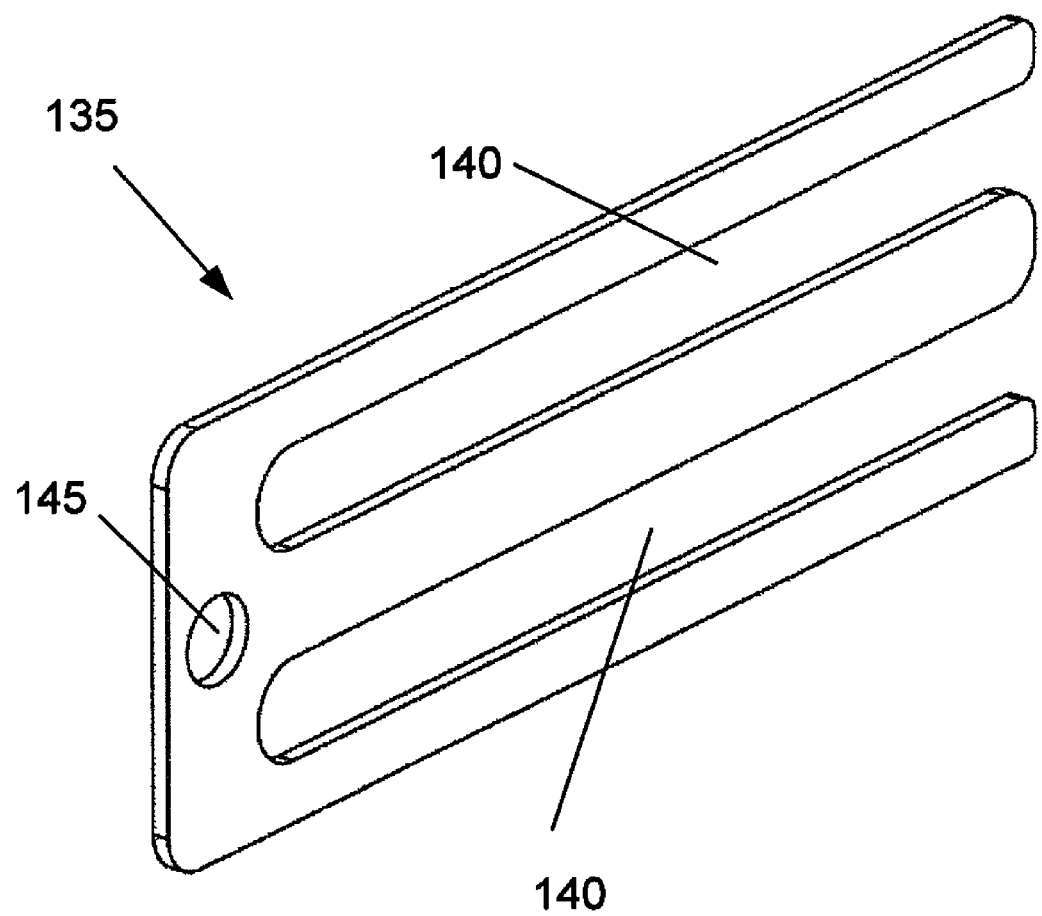
FIG. 7 is a perspective view of a closure member as shown in FIG. 1.
Figure 8:
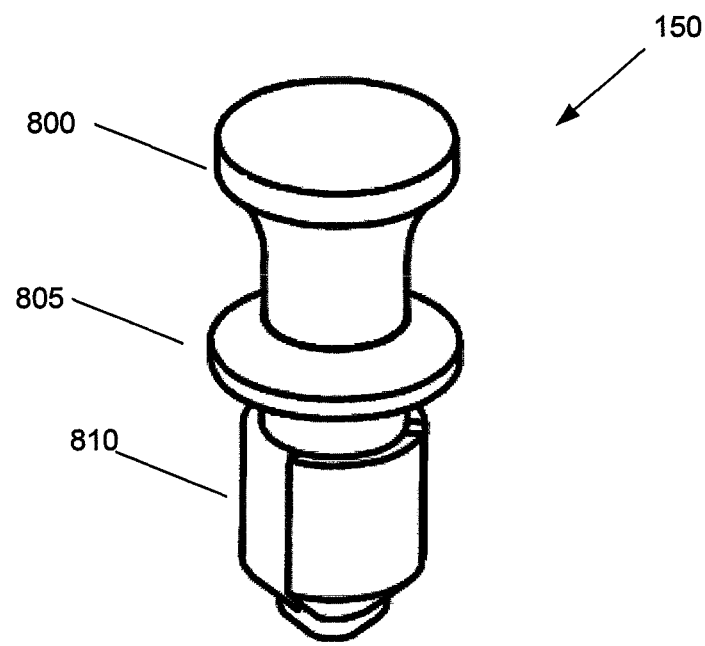
FIG. 8 is a perspective view of a retainment pin as shown in FIG. 1.

Although the male coupling 110 (and equivalently the female coupling 105) is depicted in FIG. 1 as being inserted on an end of the cable 115, the male coupling 110 can be installed onto a cable 115 having fixed, pre-terminated ends because of a slot feature defined along a longitudinal axis through its body, described in further detail below.

A holder 120 is shown having a plurality of U-shaped slotted edge features 125. In general, the slotted edge features 125 are sized and configured to receive complementary features defined on an external surface of the body of the female coupling 105. In one embodiment, the slotted edge features receive the complementary features of the female coupling 105 when a mated cable retainer is moved relative to the holder 120 in a direction transverse to the longitudinal axis N. Additionally, the holder 120 can be formed having a plurality of first retainment apertures 130 defining a passage through the body of the holder 120. In the example embodiment, a first retainment aperture is formed on opposite ends of the holder 120. The holder 120 can be formed of any material such as a thermoplastic elastomer, or a metal such as aluminum.

Upon positioning a mated cable retainer within the U-shaped slotted edge features 125 of the holder 120, a plurality of closure members 135, each having respective slot features 140, can be moved in a planar direction relative to the holder 120 such that the closure members 135 are mounted to the holder 120. In this manner, one or more mated cable retainers positioned in respective U-shaped slotted features 125 are secured to the holder 120, as the mounted closure members 135 close the open end of the U-shaped slotted features 125.

Each respective closure member 135 additionally includes a second retainment aperture 145 that aligns coincidentally with a respective first retainment aperture 130 formed on the holder 120 when positioned accordingly. In this manner, a retainment pin 150 can be inserted therethrough to secure the respective closure member 135 with respect to the holder 120. The retainment pin 150 is formed with a push head 800, a flanged surface 805, and a flexible protrusion 810. In use, force is applied to the push head 800 to insert the retainment pin 150 through the coincidently aligned respective first retainment aperture 130 and second retainment aperture 145 until the flanged surface 805 is in contact with the closure member 135. During the insertion process the flexible protrusion 810 is deformed. After the protrusion 810 passes through the coincident apertures 130,145 the original shape of the protrusion is restored, thereby restricting movement of the closure member 135 with respect to the holder 120 to form an assembled cable retainer assembly. Subsequently, the assembled cable retainer assembly can be secured to and/or positioned to any desirable surface such as a bulkhead.

Figure 9:
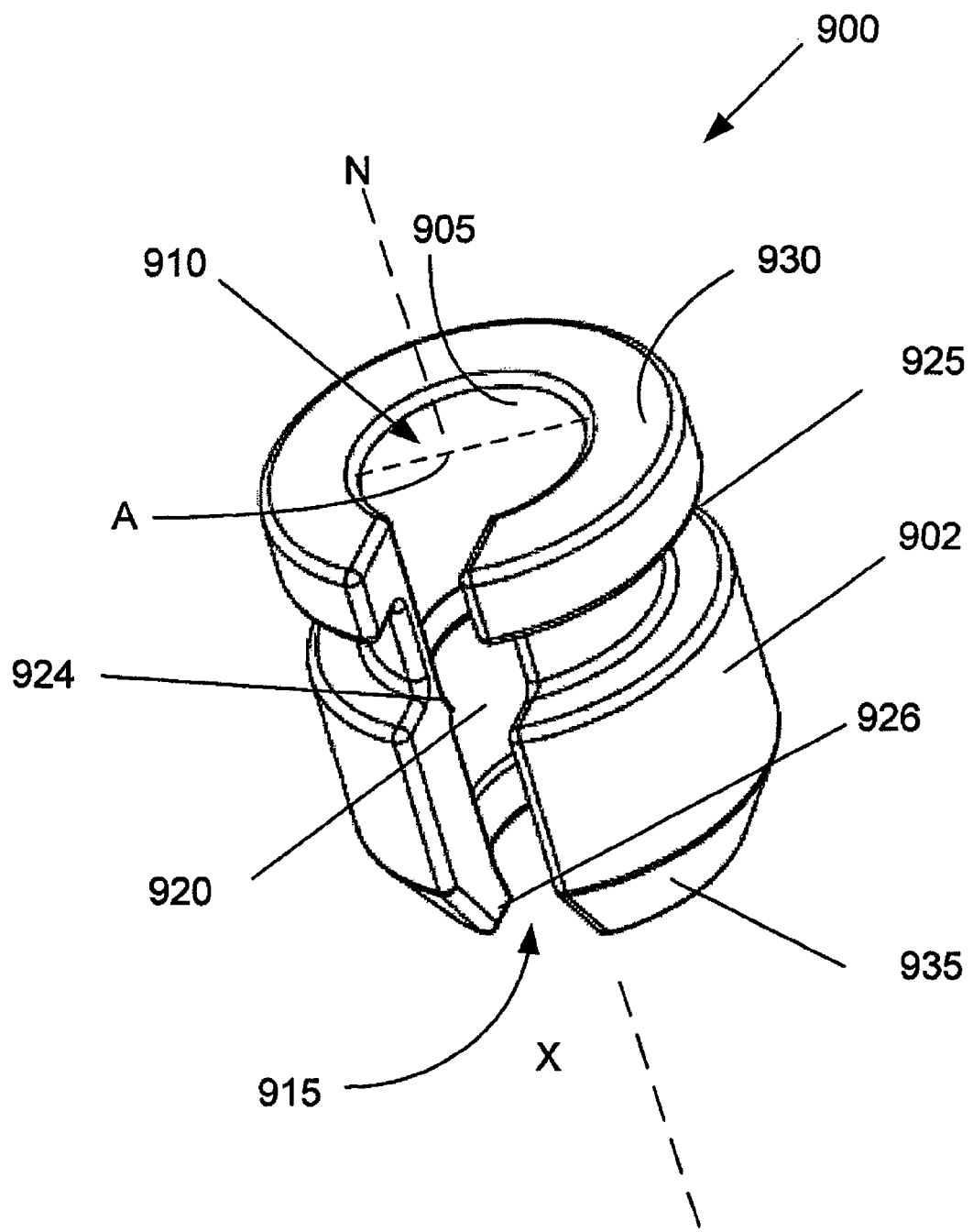
FIG. 9 is a perspective view of a female coupling.
Figure 10:
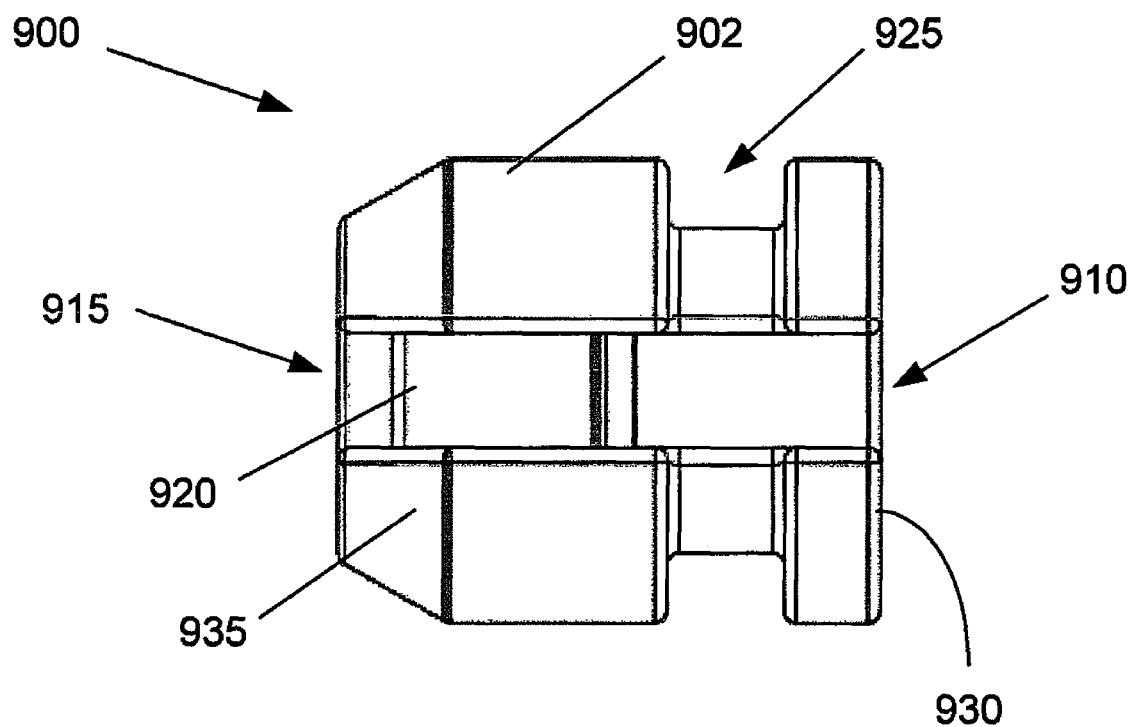
FIG. 10 is a side view of the female coupling of FIG. 9.
Figure 11:
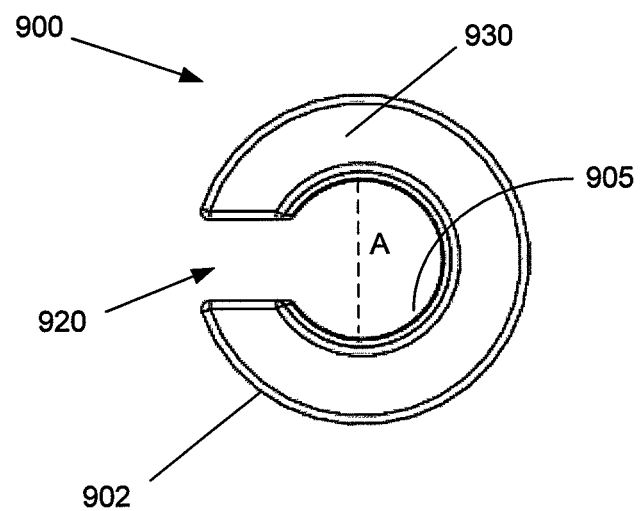
FIG. 11 is an end view of the female coupling of FIG. 9.
Figure 12:
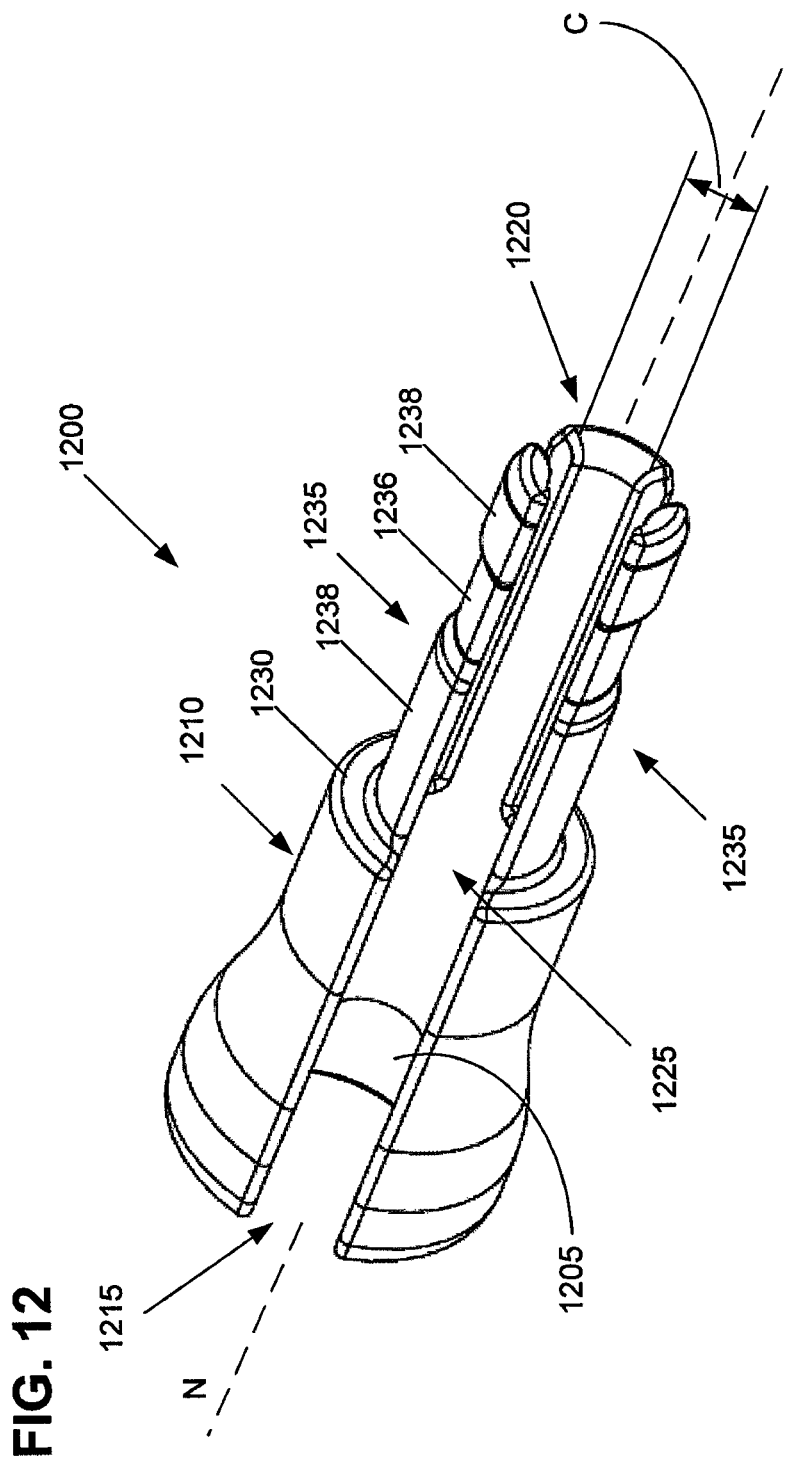
FIG. 12 is a perspective view of a male coupling.
Figure 13:
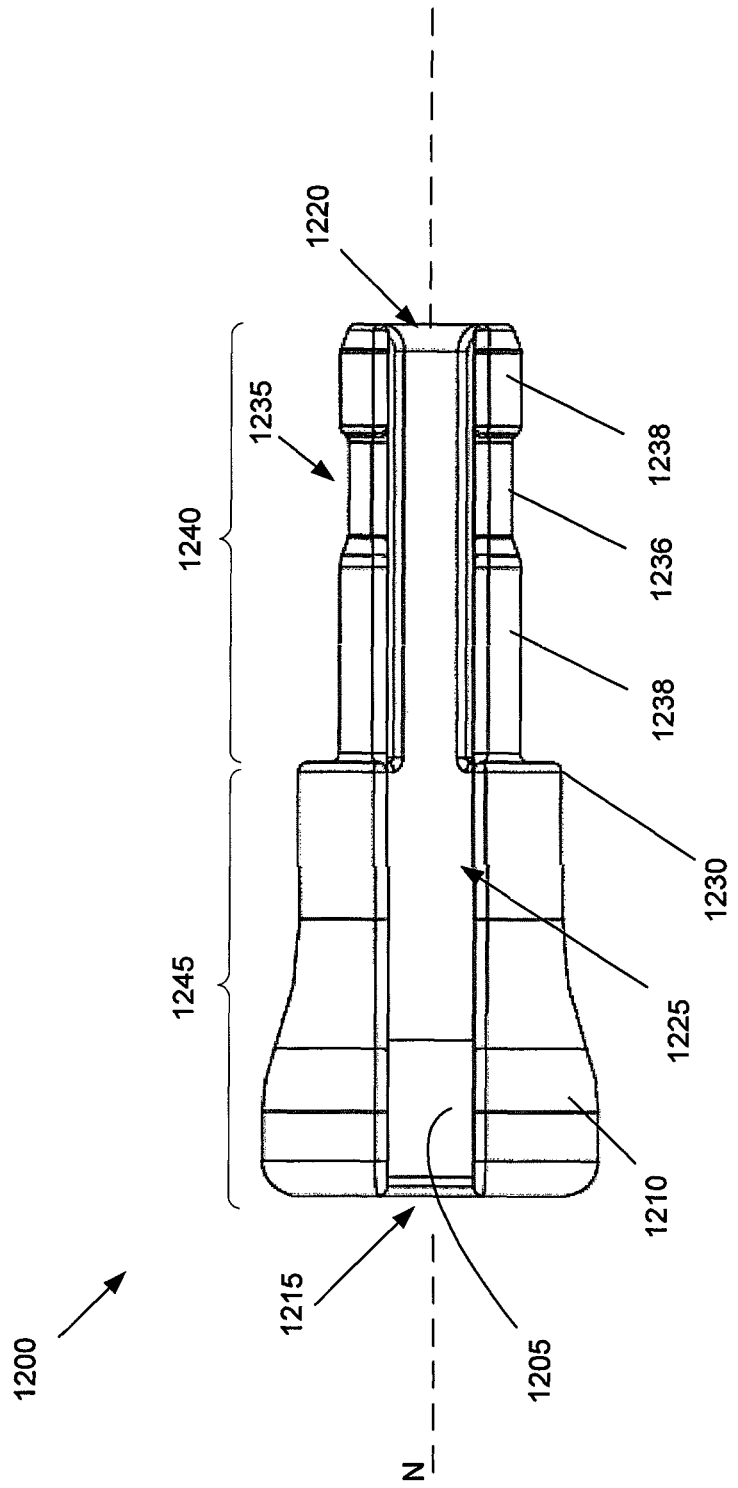
FIG. 13 is a side view of the male coupling of FIG. 12.
Figure 14:
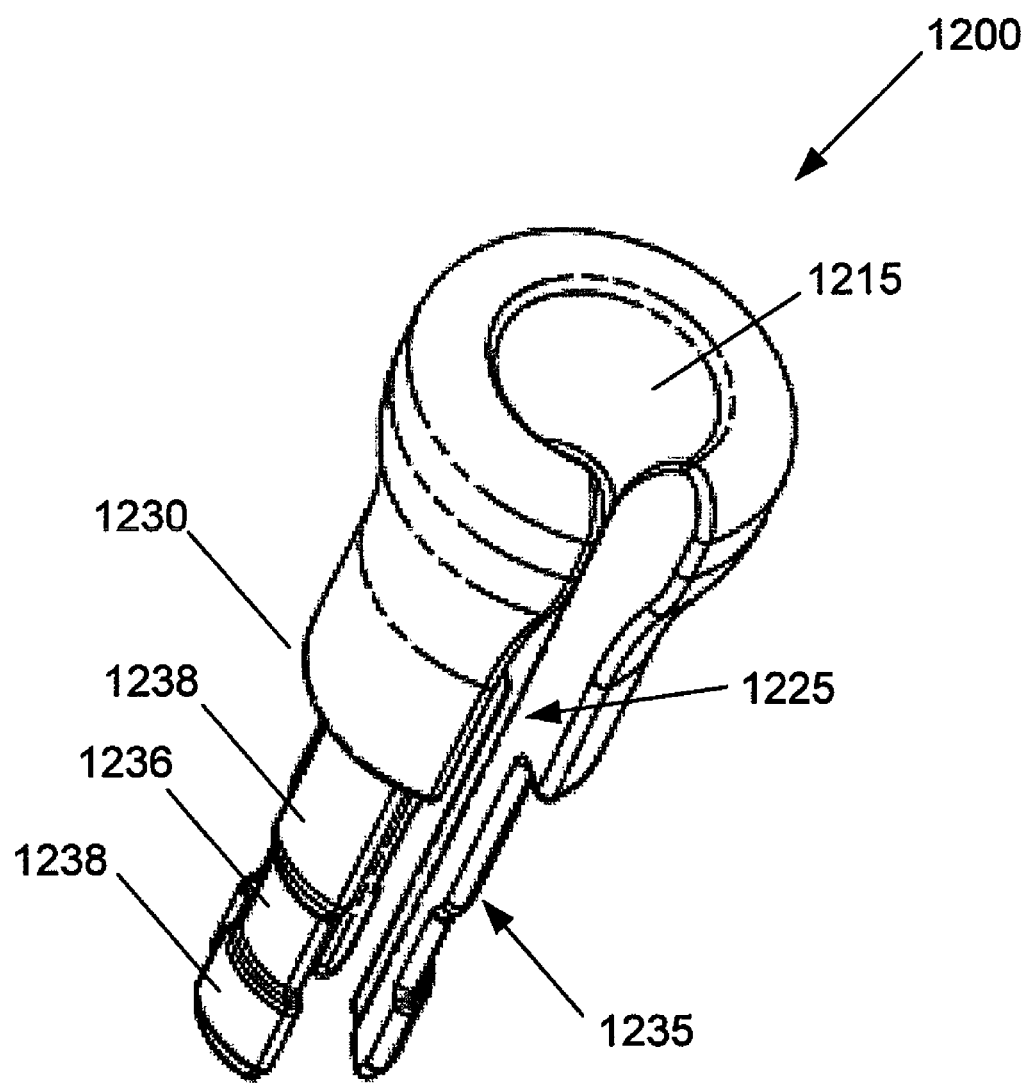
FIG. 14 is an alternate perspective view of the male coupling of FIG. 12.
Figure 15:
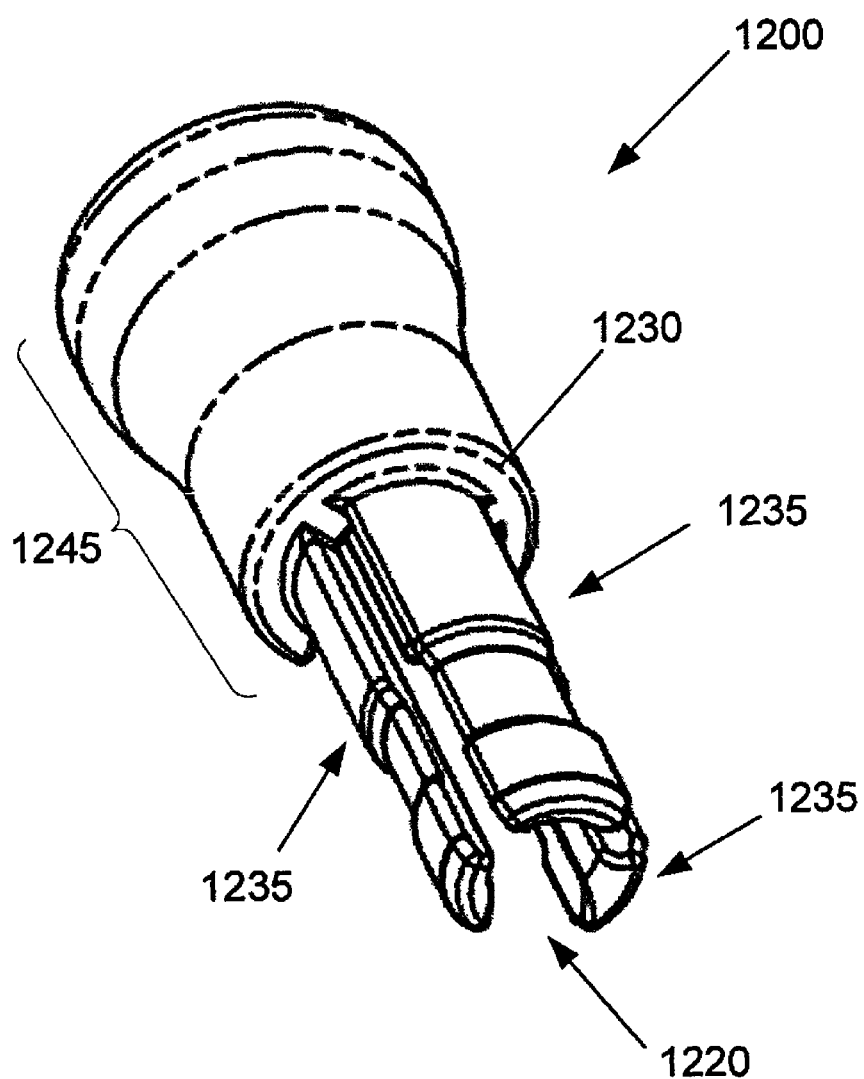
FIG. 15 is a second alternate perspective view of the male coupling of FIG. 12.
Figure 16:
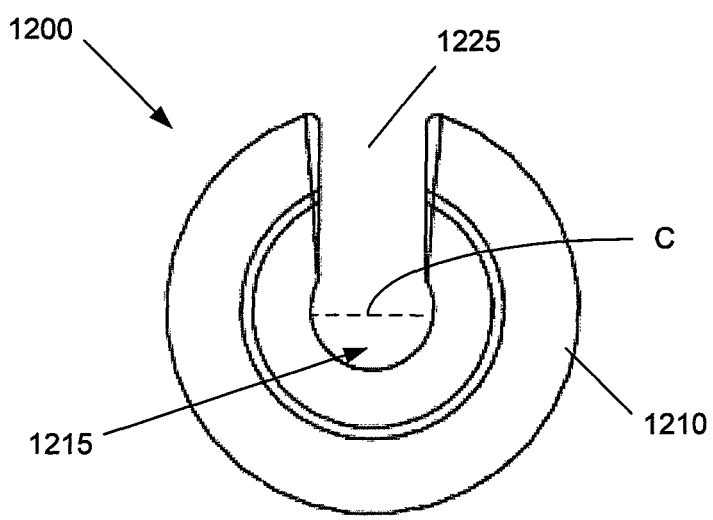
FIG. 16 is a first end view of a male coupling of FIG. 12.
Figure 17:
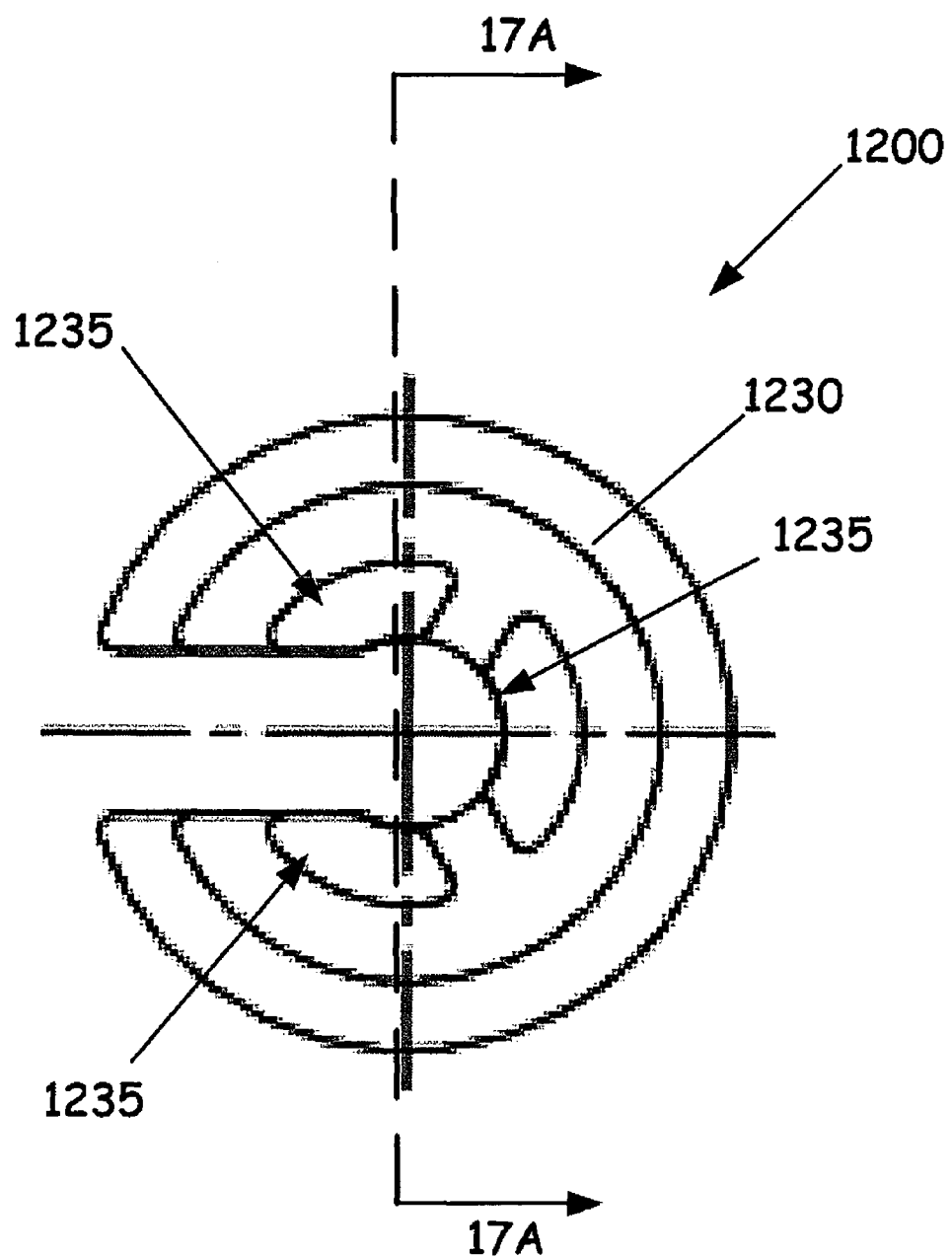
FIG. 17 is a second end view of a male coupling of FIG. 12.
Figure 17A:
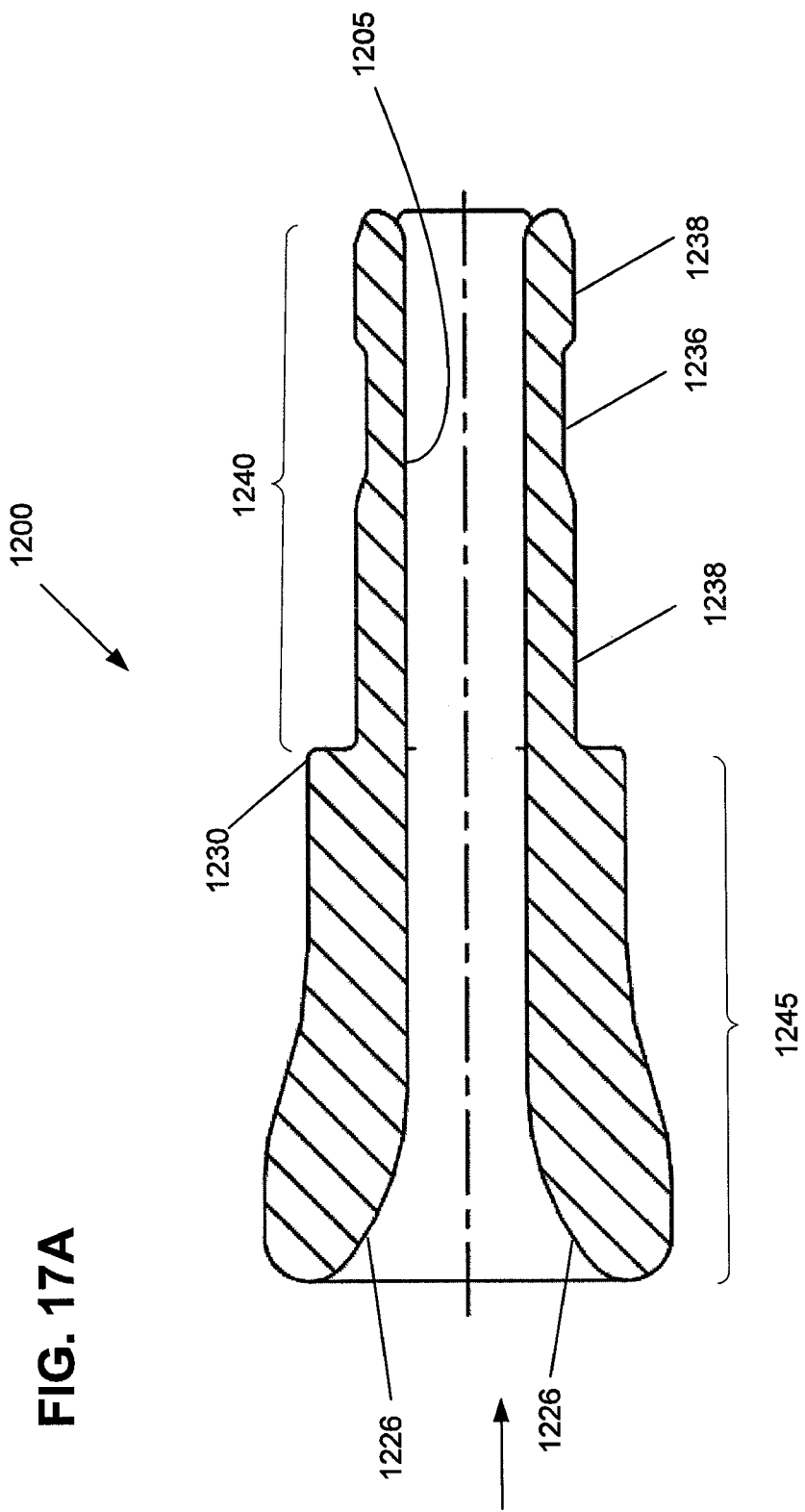
FIG. 17A is a cross-sectional view of the male coupling taken along the lines 17A-17A of FIG. 17.

Referring now to FIGS. 9-11, a female coupling 900 is shown. In the example embodiment, the female coupling 900 is similar to the female coupling 105 as described with reference to FIG. 1. In general, the female coupling 900 has a body having a cylindrical shape about the longitudinal axis N. The female coupling 900 has an external surface 902 and an internal surface 905. The internal surface 905 is defined by a first end opening 910 and a second end opening 915 such that a passage having an inner diameter A is formed through the body of the female coupling 900. Additionally, the female coupling 900 has a side slot 920 formed extending radially from the external surface 902 to the internal surface 905 and extending longitudinally from the first end opening 910 to the second end opening 915. Preferably, female coupling 900 includes to inner ribs 924, 926 which cooperate with the male coupling 1200 to clamp onto a cable.

In the example embodiment, a cable (see FIG. 1) can be positioned into the passage of the female coupling 900 by inserting the cable into the first end opening 910 (or equivalently through the second end opening 915) and threading the cable through the second end opening 915 via the passage such that the female coupling 900 engages the cable as a sleeve fitting. Alternatively, a cable can be positioned within the passage of the female coupling 900 by pressing the cable lengthwise through the side slot 920. In this manner, the female coupling 900 can be placed anywhere along the length of the cable, regardless if the cable has one or more pre-terminated ends. The physical dimensions of the female coupling 900 can be selectively formed (e.g., molded) such that any cable having an arbitrary diameter can be positioned into the passage of the female coupling 900. The female coupling 900 can be formed from any durable and/or resilient material such as a thermoplastic elastomer or a metallic material such as aluminum, etc.

The external surface 902 of the female coupling 900 has a circumferential notch 925 formed along an outer circumference of the external surface 902. The circumferential notch 925 is formed such that the female coupling 900 can be mounted into the slotted edge feature 125 of holder 120, as described above with respect to FIG. 1. In this manner, a mated cable retainer can be positioned to the holder 120.

The external surface 902 of the female coupling 900 further includes an end opening surface 930, near the first end opening 910, and a beveled surface 935 near the second end opening 915. The beveled surface 935 generally tapers inwardly towards the longitudinal axis N until terminating at the second end opening 915.

Referring now to FIGS. 12-17, a male coupling 1200 is shown. In the example embodiment, the male coupling 1200 is similar to the male coupling 110 as described with reference to FIG. 1. In general, the male coupling 1200 has a body having a cylindrical shape about a longitudinal axis N. The male coupling 1200 has an internal surface 1205 and an external surface 1210. The internal surface 1205 is defined by a first end opening 1215 and a second end opening 1220 such that a passage having an inner diameter C is formed through the body of the male coupling 1200. Additionally, the male coupling 1200 has a side slot 1225 formed extending radially from the external surface 1210 to the internal surface 1205 and extending longitudinally from the first end opening 1215 to the second end opening 1220. Curved surface portion 1226 of internal surface 1205 adjacent to first end opening 1215 has a flared shape for bend radius protection of the cable positioned within male coupling 1200.

In the example embodiment, the external surface 1210 of the male coupling 1200 generally tapers inwardly towards the longitudinal axis proceeding from the first end opening 1215 towards the second end opening 1220 along the longitudinal axis N. The external surface 1210 of the male coupling 1200 includes portions defining a shoulder 1230 formed in a region between the first end opening 1215 and the second end opening 1220. In general, the shoulder 1230 has an outer diameter larger than the diameter A of the internal surface of the passage of the female coupling 900 (see FIG. 9).

The external surface 1210 of the male coupling 1200 further includes a plurality of flexible projections 1235. In the example embodiment, the projections 1235 extending from the shoulder 1230 to the second end opening in a direction parallel to the longitudinal axis N to form a male coupling complementary feature 1240. Each respective flexible projection includes a notch 1236, thereby defining an outer surface 1238.

In a similar manner, as described with regards to the female coupling 900 described with respect to FIGS. 9-11, a cable can be positioned into the passage of the male coupling 1200 by inserting the cable into the first end opening 1215 (or equivalently through the second end opening 1220) and threading the cable through the second end opening 1220 via the passage. In this manner, the male coupling 1200 engages the cable as a sleeve fitting. Alternatively, the cable can be positioned within the passage of the male coupling 1200 by pressing the cable lengthwise through the side slot 1225 such that the male coupling 1200 can be placed anywhere along the length of the cable, regardless if the cable has one or more pre-terminated ends. The physical dimensions of the male coupling 1200 can be selectively formed (e.g., molded) such that any cable (or cable bundle) having an arbitrary diameter can be positioned into the passage of the male coupling 1200. Additionally, the male coupling 1200 can be formed from any durable and/or resilient material such as a thermoplastic elastomer or a metallic material such as aluminum, etc.

Figure 18:
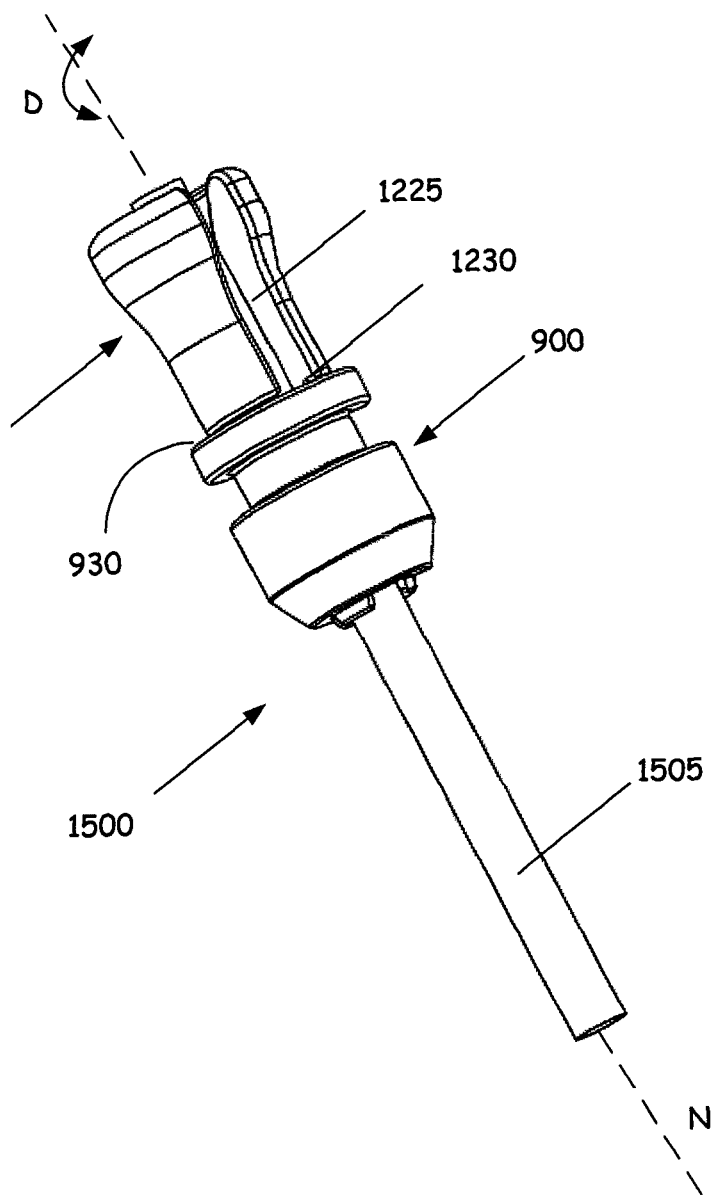
FIG. 18 is a perspective view of a mated cable retainer positioned on a cable.
Figure 19:
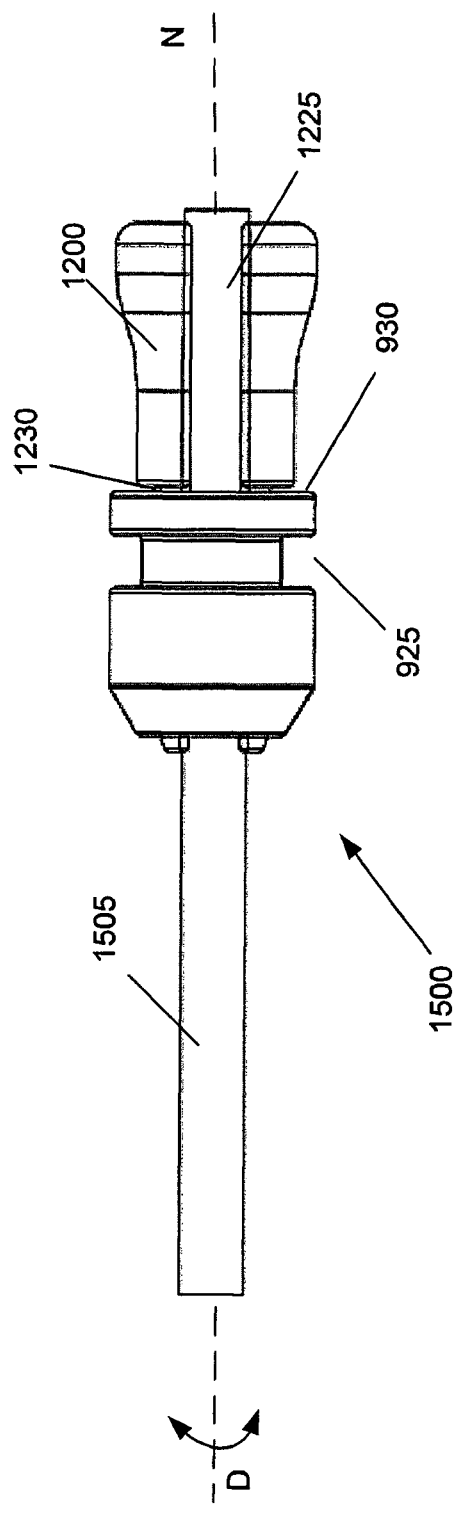
FIG. 19 is a side view of the mated cable retainer and cable of FIG. 18.
Figure 20:
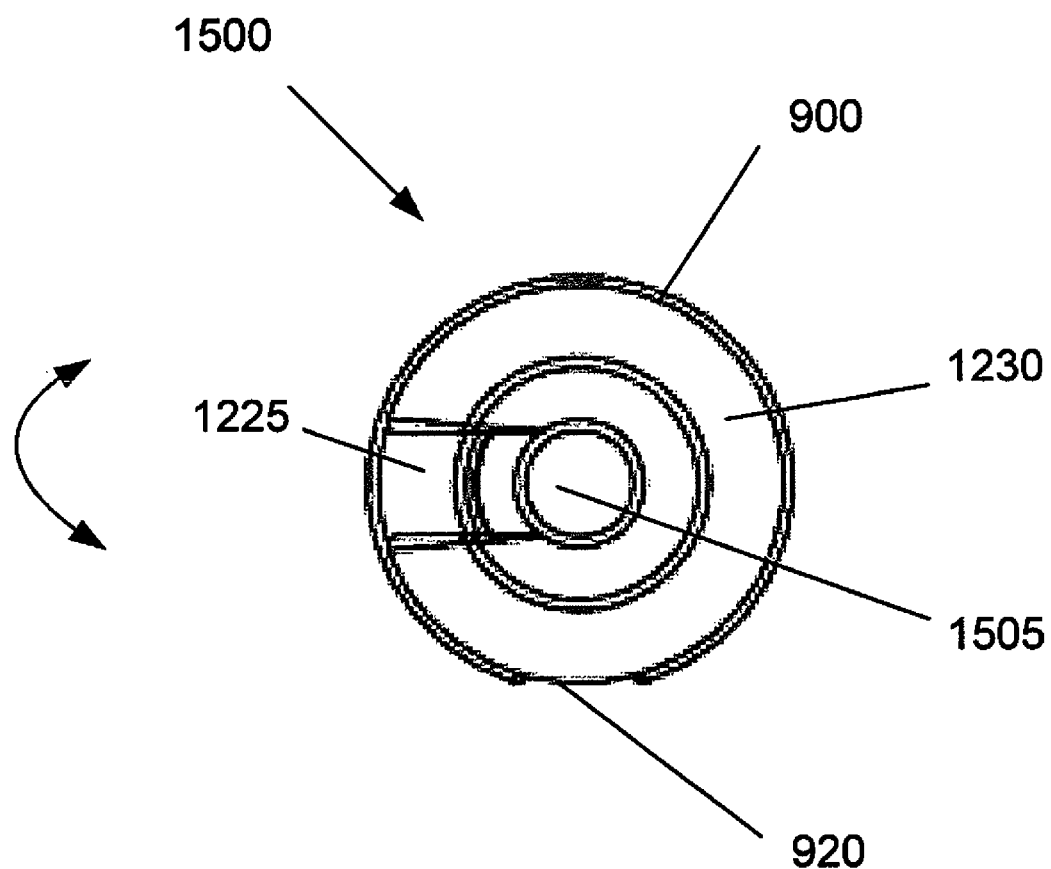
FIG. 20 is an end view of the mated cable retainer and cable of FIG. 18.

Referring now to FIGS. 18-20, an example mated cable retainer 1500 is shown engaged with a cable 1505, the mated cable retainer 1500 is formed with the male coupling 1200 and the female coupling 900 as described with respect to FIGS. 9-11.

As previously mentioned, the female coupling 900 can be positioned on a portion the cable 1505 as a movable sleeve fitting. In a similar manner, the male coupling 1200 is positioned on a nearby portion of the cable 1505 such that each respective passage of both the female coupling 900 and the male coupling 1200 radially engage the cable along the cable longitudinal axis N. In use, the male coupling 1200 is positioned on the cable 1505 in an orientation such that the male complementary feature 1240 can be inserted into the first end opening 910 of the female coupling 900. In this manner, the male coupling 1200 is moved along the length of the cable 1505 and subsequently pressed into the passage of the female coupling 900 such that the female coupling inner diameter A accepts the male coupling complementary feature 1240 to form a mated cable retainer.

The male coupling complementary feature 1240 is inserted into the first end opening 910 of the female coupling 900 until the shoulder 1230 of the male coupling 1200 is in contact with the end opening surface 930 of the female coupling 900, thereby securing the mated cable retainer via a radial clamping mechanism to the cable 1505. Still referring to FIGS. 18-20, in one example embodiment a mated cable retainer locking mechanism is realized. As depicted, the male coupling 1200 can be rotated along the longitudinal axis N with respect to the female coupling 900 (in directions D) such that the male coupling side slot 1225 and the female coupling side slot 920 are not coincident, thereby reducing the risk of the cable retainer decoupling via intentional or unintentional movement of the cable 1505.

In the example embodiment, the radial securing mechanism is engaged via actuation of the male coupling flexible projections 1235 formed on the complementary feature 1240. The outer surfaces 1238 of the flexible projections 1235 have a diameter larger than the inner diameter A of the female coupling 900. In this manner, as the male coupling complementary feature 1240 is forced into the first end opening 910 of the female coupling 900, the outer surfaces 1238 of the flexible projections 1235 radially engage the inner diameter the female coupling 900, thereby forcing the male coupling complementary feature 1240 into a smaller area such that the male coupling passage, defined by the inner diameter C closes up as the diameter is reduced. In this manner, a radial clamping force is exerted on the cable jacketing, effectively securing the mated cable retainer via a radial clamping mechanism to the cable 1505.

Figure 21:
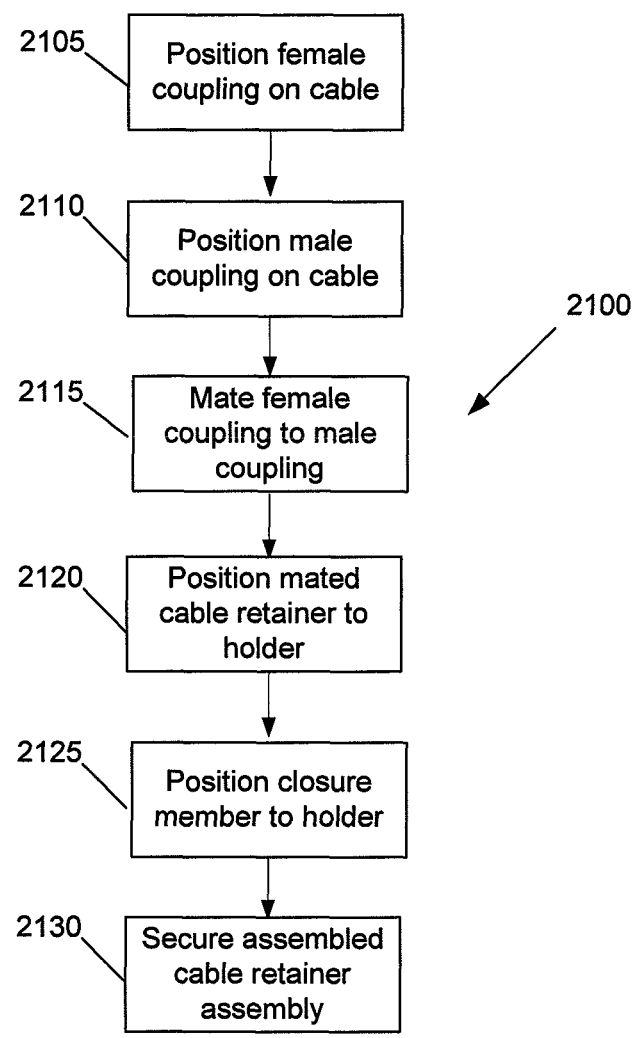
FIG. 21 is an example method to assemble the cable retainer assembly of FIG. 1.
Figure 22:
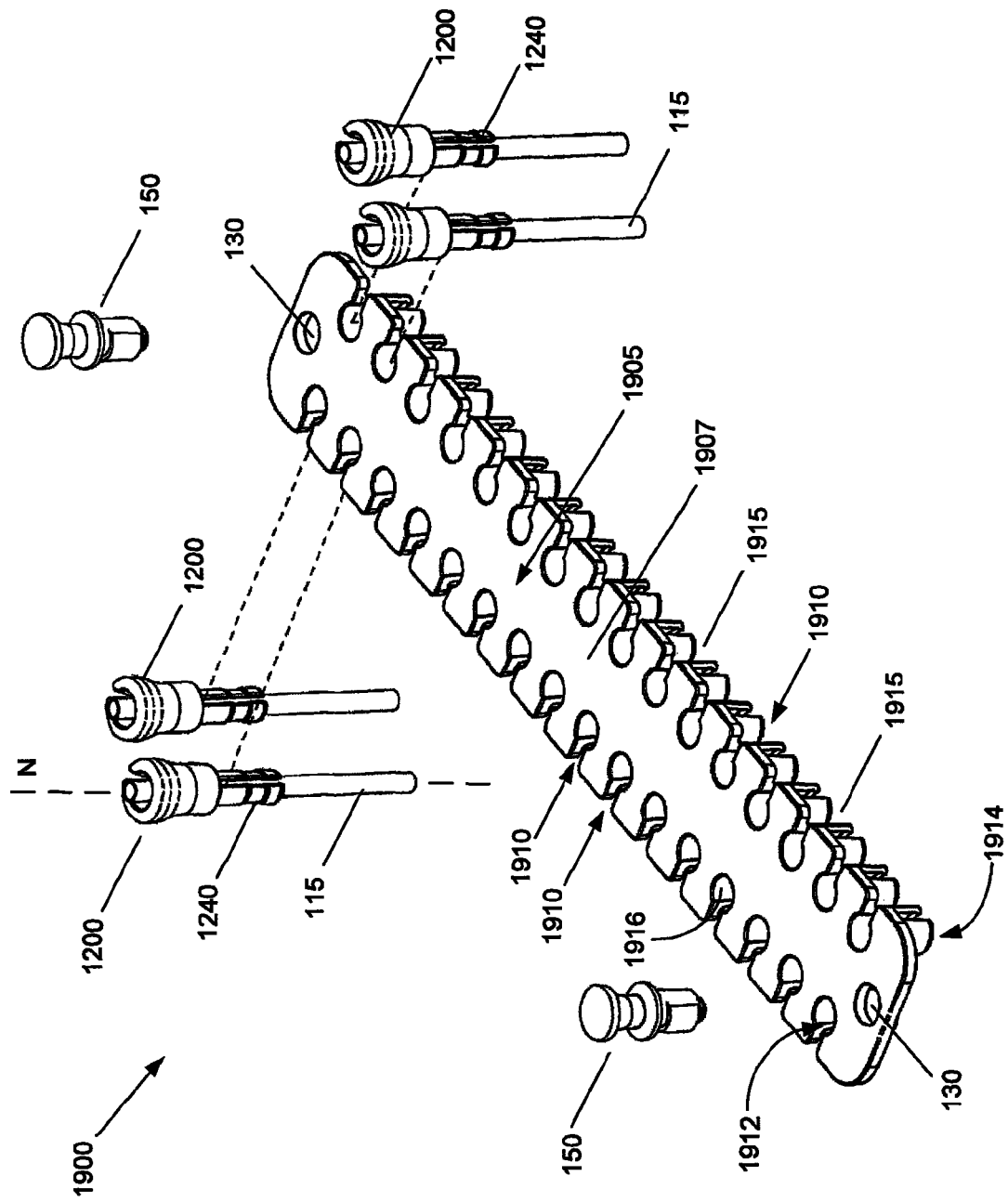
FIG. 22 is an exploded perspective view of a second example cable retainer assembly.
Figure 23:
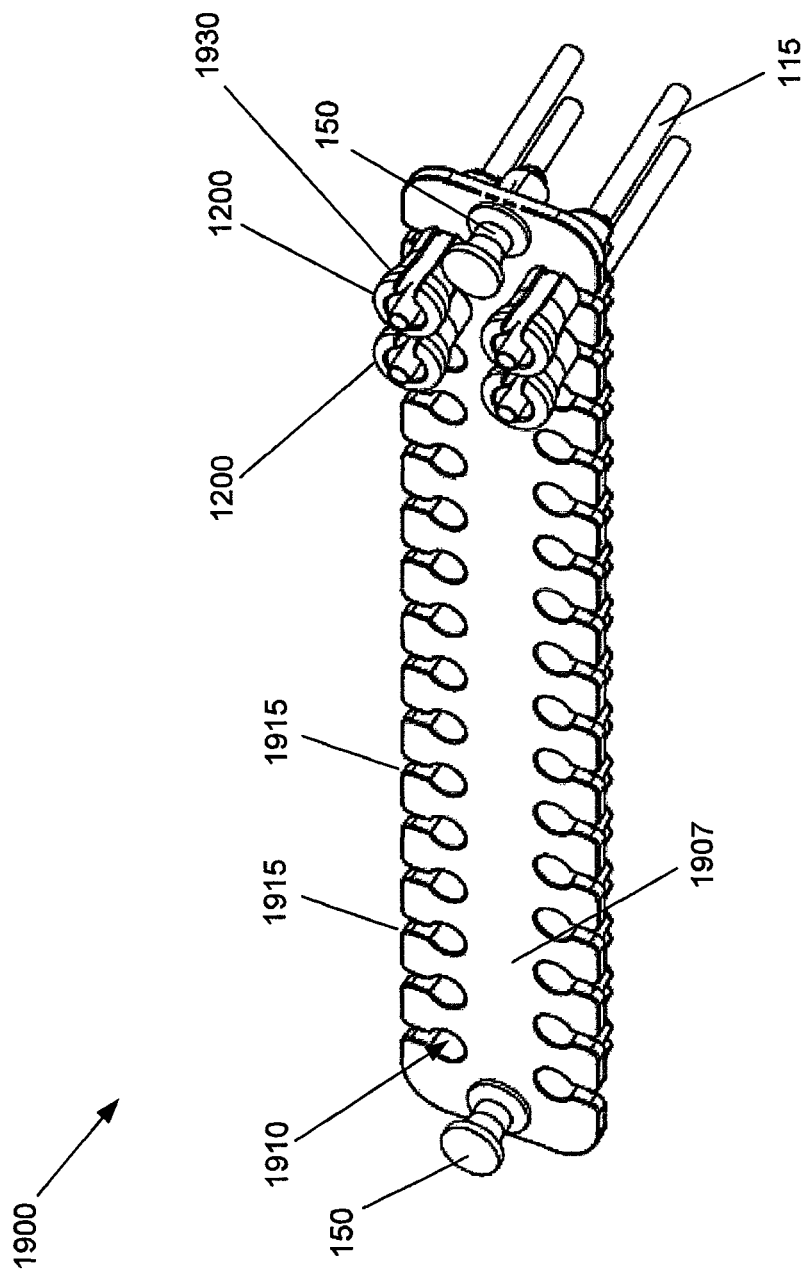
FIG. 23 is a perspective view of an assembled second example cable retainer assembly.
Figure 24:
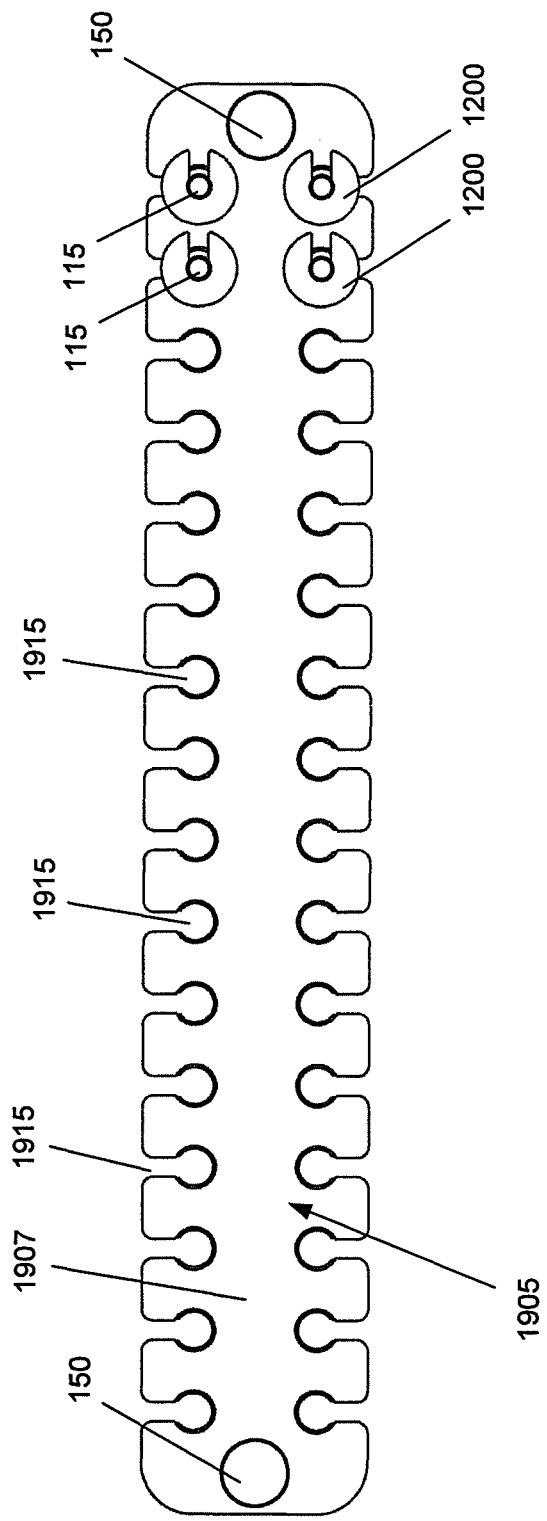
FIG. 24 is a top view of the assembled cable retainer assembly of FIG. 23.
Figure 25:
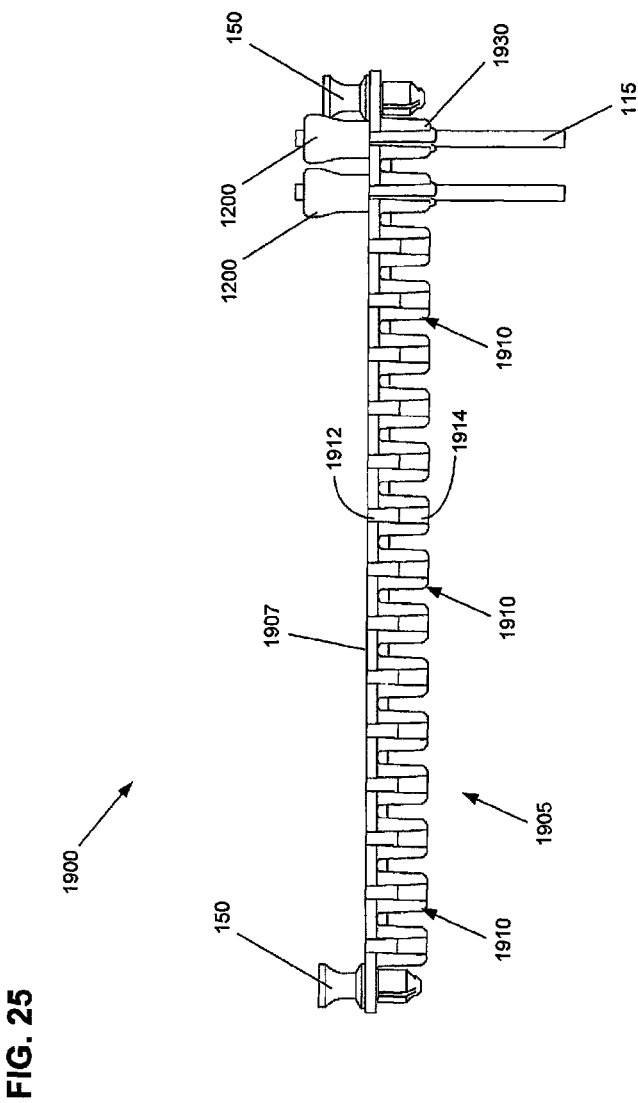
FIG. 25 is a first side view of the assembled cable retainer assembly of FIG. 23.
Figure 26:
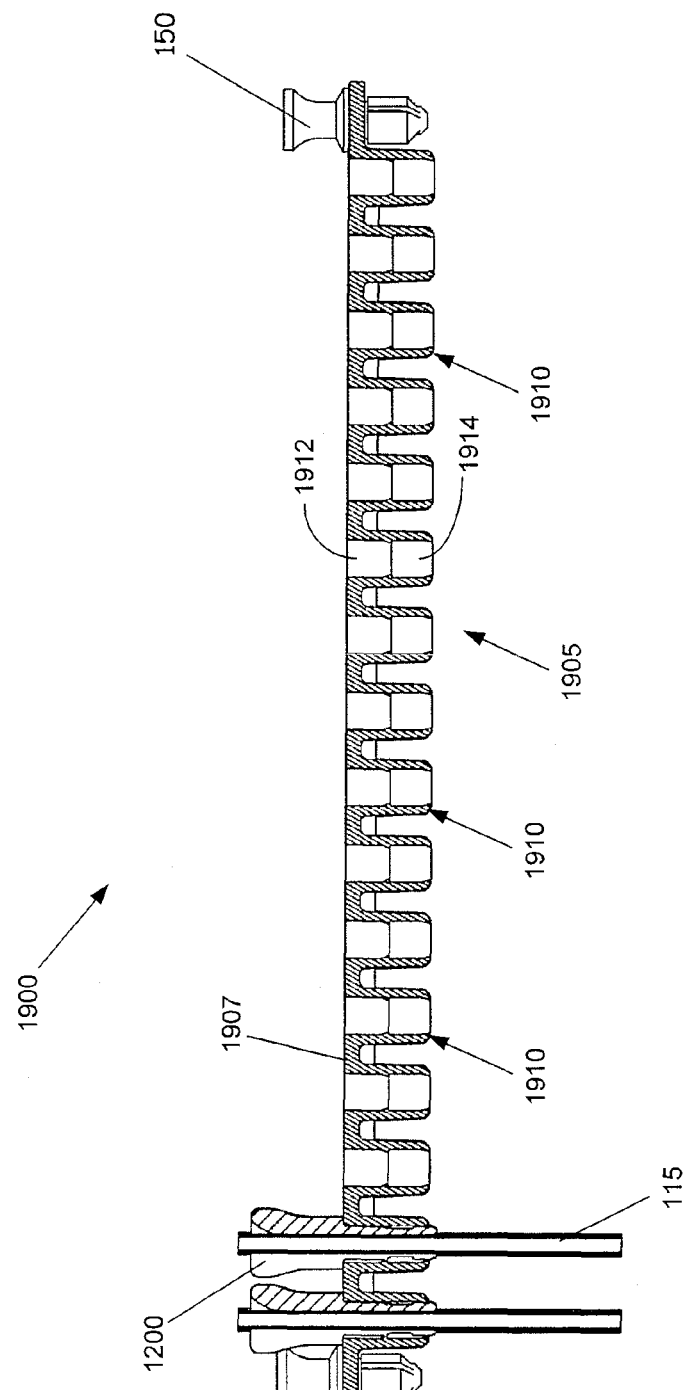
FIG. 26 is a second side cross sectional view of the assembled cable retainer assembly of FIG. 23.
Figure 27:
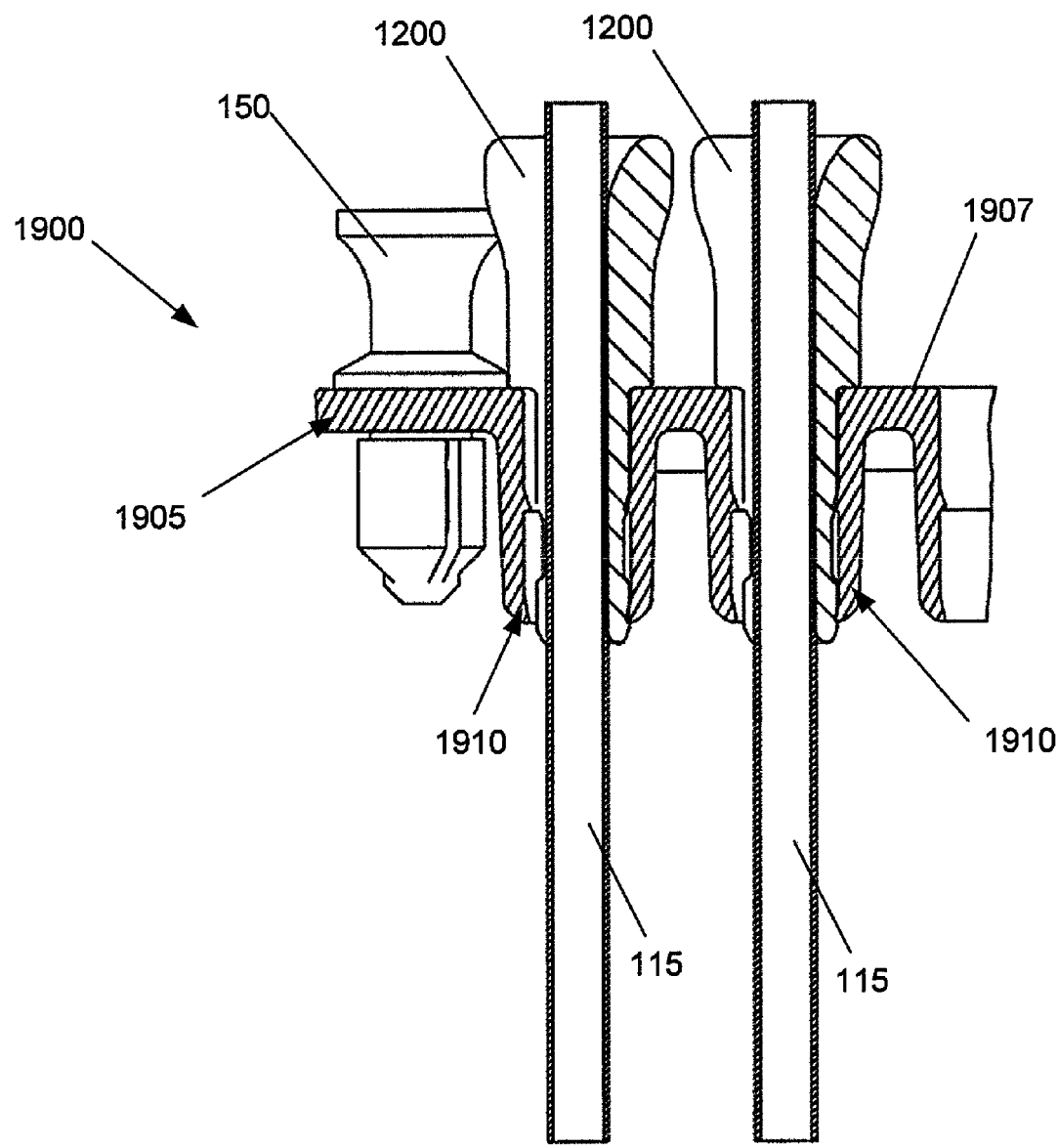
FIG. 27 is a first end portion of the second side cross sectional view of FIG. 26.

Referring now to FIG. 21, an example method 2100 is shown to engage a male coupling and a female coupling into a mated cable retainer. One or more mated cable retainers can be secured to a holder, thereby forming a cable retainer assembly such that one or more cables and/or cable bundles can be positively restrained and organized. In one example embodiment, the male coupling, female coupling, holder, closure members, and retainment pin are similar to the corresponding elements as described with respect to FIGS. 1-20.

At operation 2105 the female coupling is positioned on an arbitrary portion of a cable as a movable sleeve fitting. In the example embodiment, a cable may be positioned into the passage of the female coupling by inserting the cable into the second end opening and threading the cable through the first end opening via the passage such that the female coupling engages the cable like a sleeve fitting.

Alternatively, at operation 2105 the female coupling can be positioned onto a portion of cable having one or both ends pre-terminated. In this alternative embodiment, the cable can be positioned within the passage of the female coupling by pressing the cable lengthwise through a slot defined in the female coupling body from the external surface of the female coupling to the internal surface, the slot extending longitudinally from the first end opening to the second end opening. In this manner, the female coupling can be placed anywhere along the length of the cable, regardless if the cable has one or more pre-terminated ends.

At operation 2110 the male coupling is positioned on an arbitrary portion cable near the female coupling as a movable sleeve fitting. In one example embodiment, the cable can be positioned into the passage of the male coupling by inserting a cable into the second end opening and threading the cable through the first end opening such that the male coupling engages the cable like a sleeve fitting. In the example embodiment, the male coupling is positioned on the cable in an orientation such that the male complementary feature can be inserted into the first end opening of the female coupling.

Alternatively, at operation 2110 the male coupling can be positioned onto a portion of cable near the female coupling in which one or both ends of the cable are pre-terminated. In this alternative embodiment, the cable can be positioned within the passage of the male coupling by pressing the cable lengthwise through the slot defined in the male coupling body from the external surface of the male coupling to the internal surface, the slot extending longitudinally from the first end opening to the second end opening. In this manner, the male coupling can be placed anywhere along the length of the cable, regardless if the cable has one or more pre-terminated ends.

Thus, after operation 2110 the male coupling is positioned on a portion of the cable in proximity to the female coupling such that the respective passage of both the female coupling and the male coupling radially engage the cable along the cable longitudinal axis. In the example embodiment, the radial engagement is sufficiently loose such that both the female coupling and the male coupling can be slidably moved along the longitudinal axis of the cable.

At operation 2115, the male coupling is moved along the cable and pressed into the female coupling such that the female coupling inner diameter accepts the male coupling complementary feature, thereby forming a mated cable retainer. In the process, the male coupling complementary feature is inserted into the first end opening of the female coupling until the shoulder of the male coupling is in direct contact with the end opening surface of the female coupling, effectively securing the mated cable retainer, via a radial clamping mechanism, to the cable.

In certain embodiments, as the male coupling complementary feature is inserted into the first end opening of the female coupling, distal ends of integrally formed flexible projections are actuated radially inward as the projections move along the internal surface of the body of the female coupling, as the end of the body of the male coupling is moved toward the second the second end of the body of the female coupling. In this manner, the male coupling is forced into a smaller area such that its inner diameter closes up, thereby exerting a radial clamping force on the cable and securing the mated retainer to the cable. Additionally, the male coupling can be rotated with respect to the female coupling to ensure that the slot features of each respective coupling are not coincidently aligned.

At operation 2120 the mated cable retainer is positioned into a respective U-shaped slotted edge feature of the holder such that the flanged collar ring of the female coupling is engaged with the slotted edge feature. This is accomplished by orientating the cable retainer to the holder and moving the mated cable retainer relative to the holder in a direction transverse to a longitudinal axis N.

At operation 2125, closure members are mounted to the holder such that the respective slot features effectively close the open end of the U-shaped slotted features on the holder. In this manner, one or more mated cable retainers positioned in a respective U-shaped slotted features are secured to the holder. The closure members are secured to the cable holder by inserting a retainment pin through a second retainment aperture of the closure member aligned coincident with the first retainment apertures formed on the holder. The retainment pin is inserted therethrough to secure the respective closure member with respective to the holder.

At operation 2130 the assembled cable retainer assembly can be secured to and/or positioned to any desirable surface such as a bulkhead.

Referring now to FIGS. 22-28, a second example system 1900 demonstrating a second example cable retainer assembly according to the principles of the present disclosure is shown. In many aspects, the cable retainer assembly of system 1900 is similar to the system 100 described above with reference to FIGS. 1-21. For example, system 1900 includes the male coupling 1200 and the plurality of retainment pins 150 as described above. System 1900 further includes a holder 1905 a plate-like shape and having a plurality of oppositely formed first retainment apertures 130 defining a passage through the body of the holder 1905. The holder 1905 of system 1900 additionally includes a plurality of integrally formed female couplings 1910. In the example embodiment, each respective female coupling 1910 is similar to the female coupling 900 described above with reference to FIGS. 9-11. The mated male coupling 1200 and female coupling 1910 form mated cable retainers 1930.

In the example embodiment, each of the plurality of female couplings 1910 extends from a first end opening 1912 to an opposite second end opening 1914. The first end opening 1912 is adjacent to a top surface 1907 of the holder 1905. Each respective female coupling 1910 further includes a side slot 1915 extending longitudinally from the first end opening 1912 to the opposite second end opening 1914, the side slot 1915 facing outwards and away from the body of the holder 1905. Each respective female coupling 1910 additionally includes an internal surface 1916 defining a passage having a diameter A. In general, the diameter A at the first end opening 1912 is larger than a second diameter at the second end opening 1914, as described above.

Figure 28:
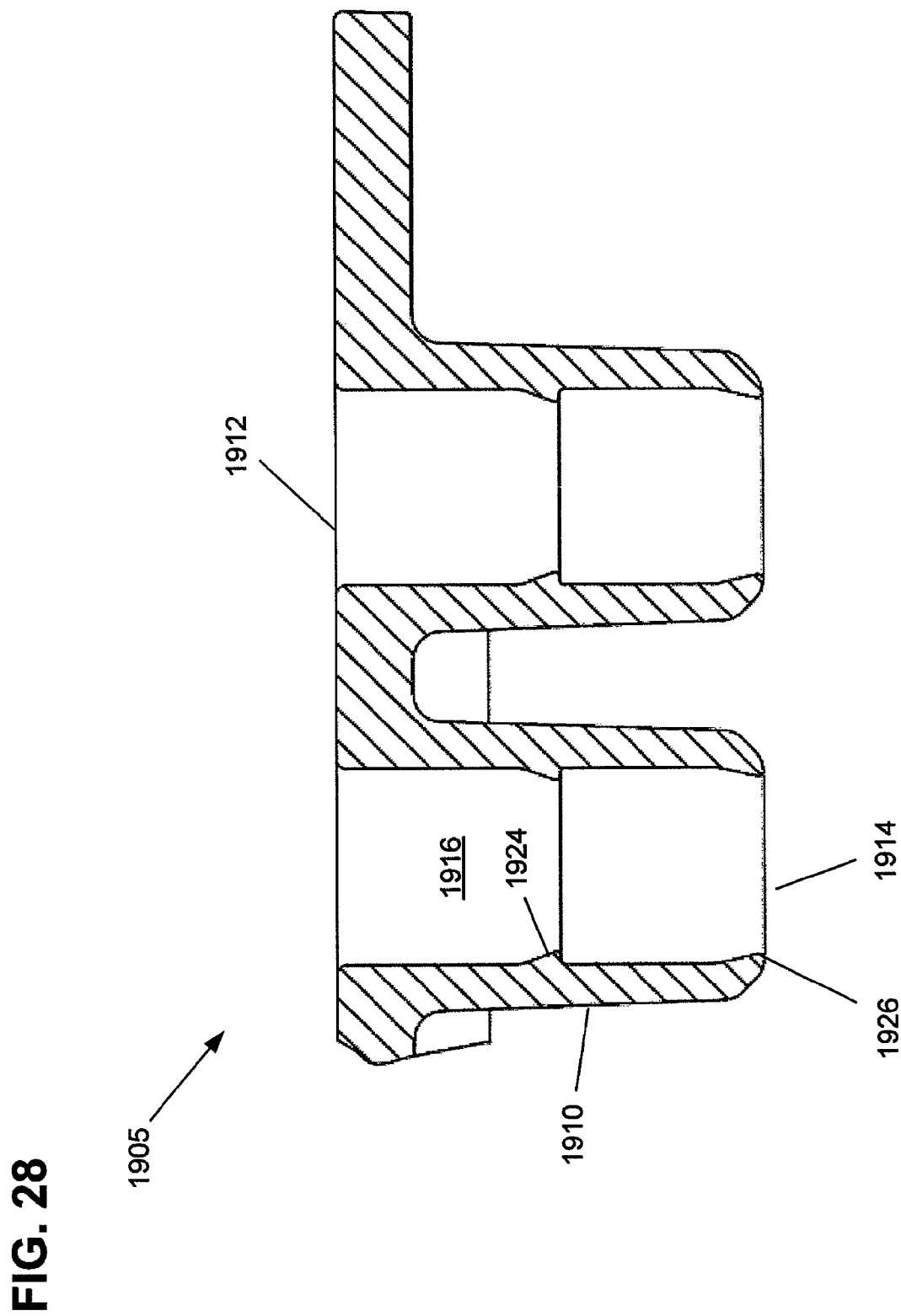
FIG. 28 is a portion of the holder of FIG. 22.
Figure 29:
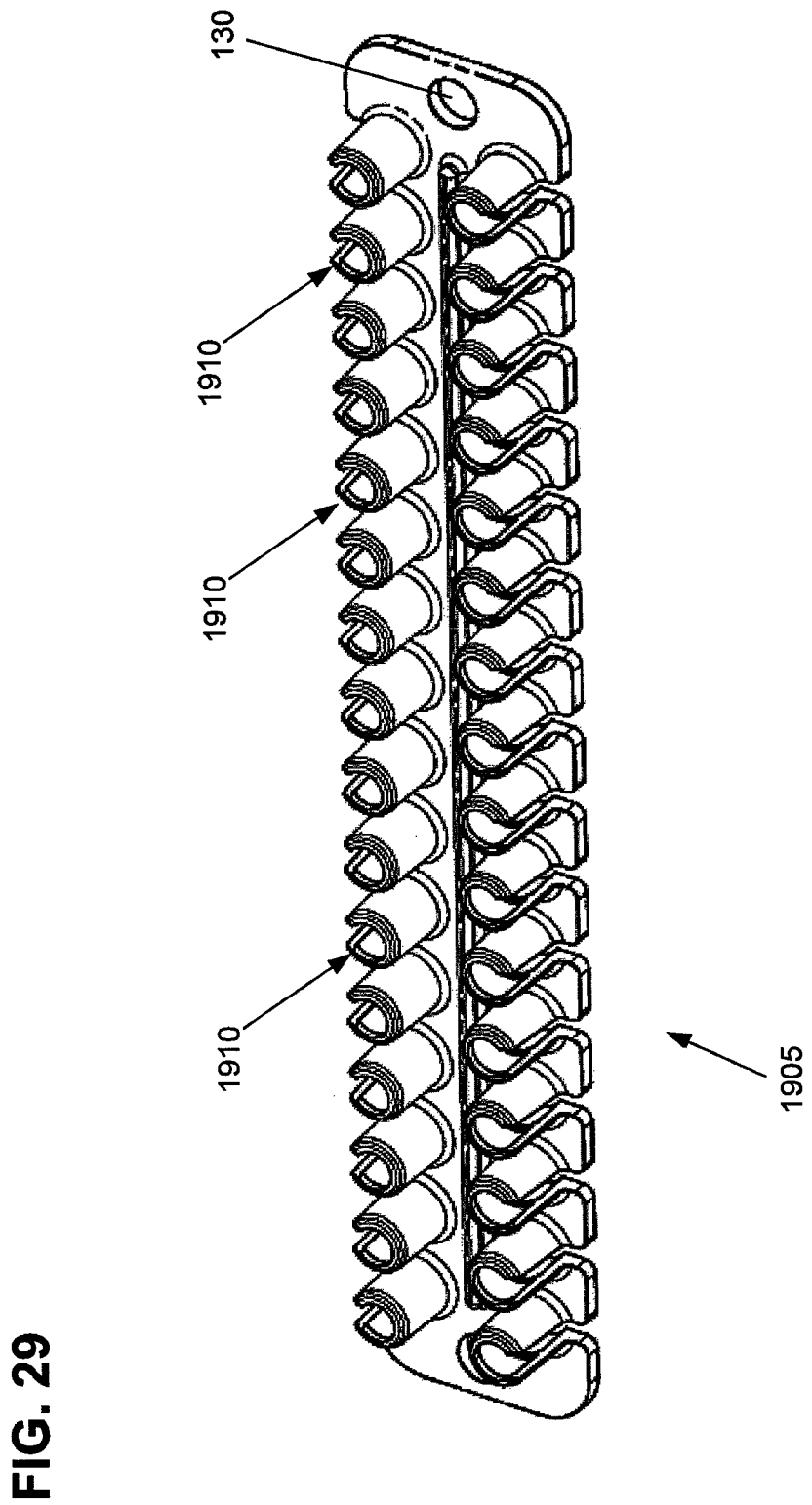
FIG. 29 is a bottom perspective view of the holder of FIG. 22.
Figure 30:
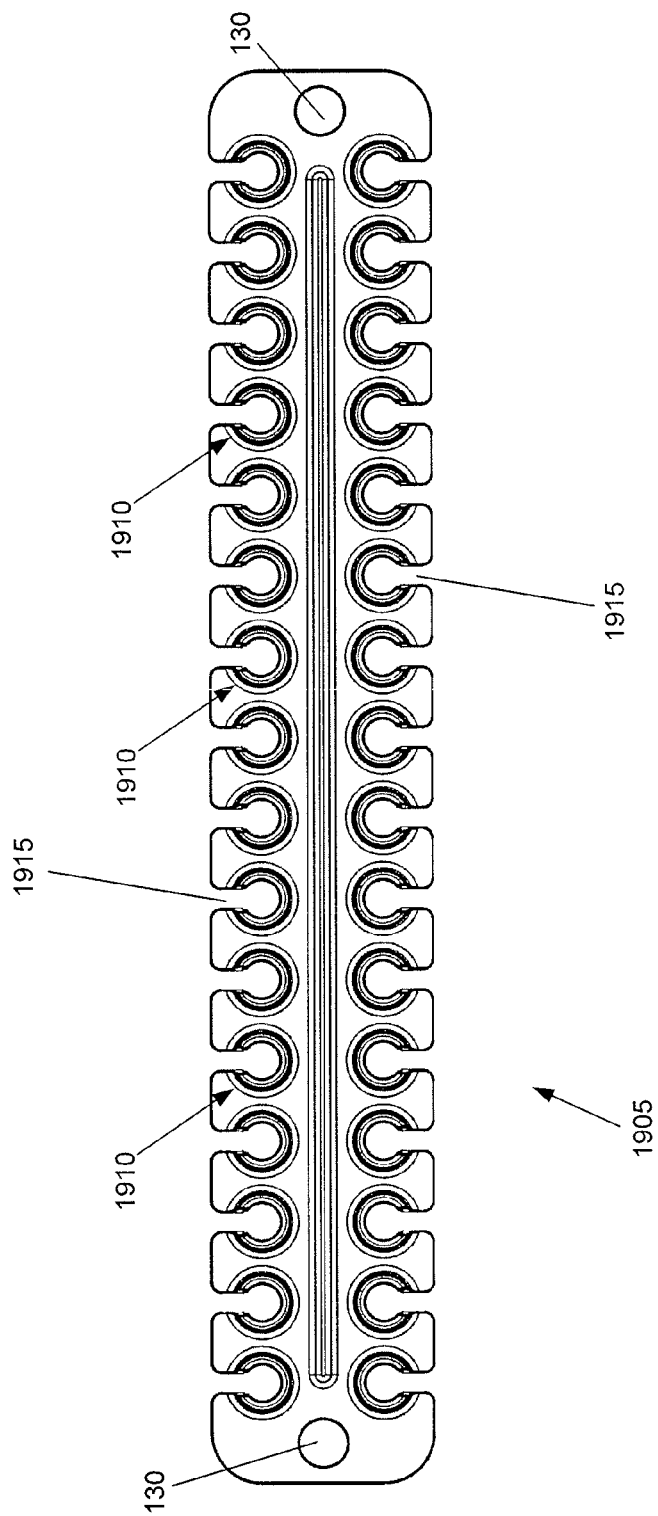
FIG. 30 is a bottom view of the holder of FIG. 22.

Referring now to FIGS. 29 and 30, the holder 1905 of system 1900 is shown. As described above, the holder 1905 includes a plurality of integrally formed female couplings 105. In one embodiment, each respective female coupling 1910 is formed to receive the complementary feature 1240 of the male coupling 1200 when the male coupling is moved relative to the holder 1905 in a direction perpendicular to the top surface 1907 of the holder 1905. Further, the holder 1905 is formed having a plurality of first retainment apertures 130 defining a passage through the body of the holder 1905. In the example embodiment, a first retainment aperture 130 is formed on opposite ends of the holder 1905. The holder 1905 can be formed of any material such as a thermoplastic elastomer, or a metal such as aluminum. As shown in FIG. 28, internal surface 1916 includes two inner ribs 1924, 1926.

A retainment pin 150 can be inserted through a first retainment aperture 130 to secure the holder 1905 to a desirable surface, such as a bulkhead. As described above, the retainment pin 150 is formed with a push head 800, a flanged surface 805, and a flexible protrusion 810. In use, force is applied to the push head 800 to insert the retainment pin 150 through the first retainment aperture 130 and a second coincidently aligned aperture formed, for example, in a bulkhead. During the insertion process the flexible protrusion 810 is deformed. After the protrusion 810 passes through the first retainment aperture 130 and a second coincidently aligned aperture, the original shape of the protrusion is restored, thereby restricting movement of the holder 1905 with respect to a bulkhead.

Figure 31:
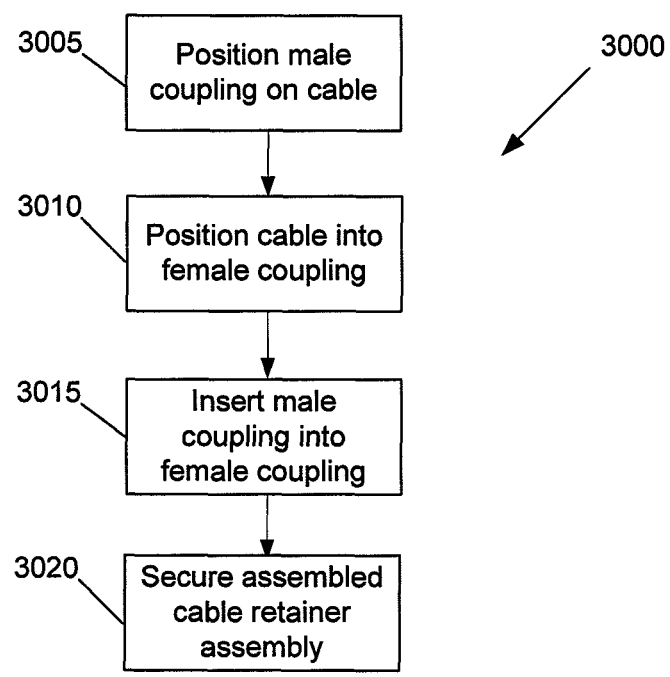
FIG. 31 is an example method to assemble the cable retainer assembly of FIG. 19.

Referring now to FIG. 31, an example method 3000 is shown to organize and/or secure one or more cables via use of the elements of the cable retainer assembly of example system 1900.

At operation 3005, a male coupling is positioned on a portion of a cable as a movable sleeve fitting. In one embodiment, the cable may be positioned into a passage of the male coupling by inserting the cable into a second end opening and threading the cable through a first end opening via the passage such that the male coupling engages the cable like a sleeve fitting.

Alternatively, at operation 3005, the male coupling can be positioned onto a portion of cable having one or both ends pre-terminated. In this alternative embodiment, the cable can be positioned within the passage of the male coupling by pressing the cable lengthwise through a slot defined in the male coupling body from an external surface of the male coupling to an internal surface, the slot extending longitudinally from the first end opening to the second end opening. In this manner, the male coupling can be placed anywhere along the length of the cable, regardless if the cable has one or more pre-terminated ends.

Thus, after operation 3005, the male coupling is positioned on a portion of the cable such that the male coupling radially engages the cable along the cable longitudinal axis. In the example embodiment, the radial engagement is sufficiently loose such that the male coupling can be slidably moved along the longitudinal axis of the cable.

At operation 3010, a section of cable in proximity to the second end opening of the male coupling (see FIG. 22) is positioned within the passage of a respective female coupling formed on the holder. In one embodiment, the cable is positioned by pressing the cable lengthwise through a slot defined in the female coupling, the slot extending longitudinally from the first end opening to the second end opening, as described above. It is noted that operations 3005 and 3010 can be performed in any order.

At operation 3015, the male coupling is slidably moved along the longitudinal axis of the cable such that the male coupling complementary feature is inserted into the first end opening of the female coupling. The insertion process proceeds until a shoulder of the male coupling is in direct contact with a top surface of the holder (see FIG. 27). In certain embodiments, as the male coupling complementary feature is inserted into the first end opening of the female coupling, distal ends of integrally formed flexible projections are actuated radially inward as the projections move along the internal surface of the body of the female coupling as the end of the body of the male coupling is moved toward the second end opening of the body of the female coupling. In this manner, the male coupling is forced into a smaller area such that its inner diameter closes up, thereby exerting a radial clamping force on the cable and securing the male coupling to the cable, and the male coupling to the holder.

At operation 3020, the cable retainer assembly can be secured to and/or positioned to any desirable surface. For example, in one embodiment, a retainment pin may be inserted through a holder retainment aperture into a complementary securing aperture formed on a bulkhead. Other embodiments are possible as well.

Figure 32:
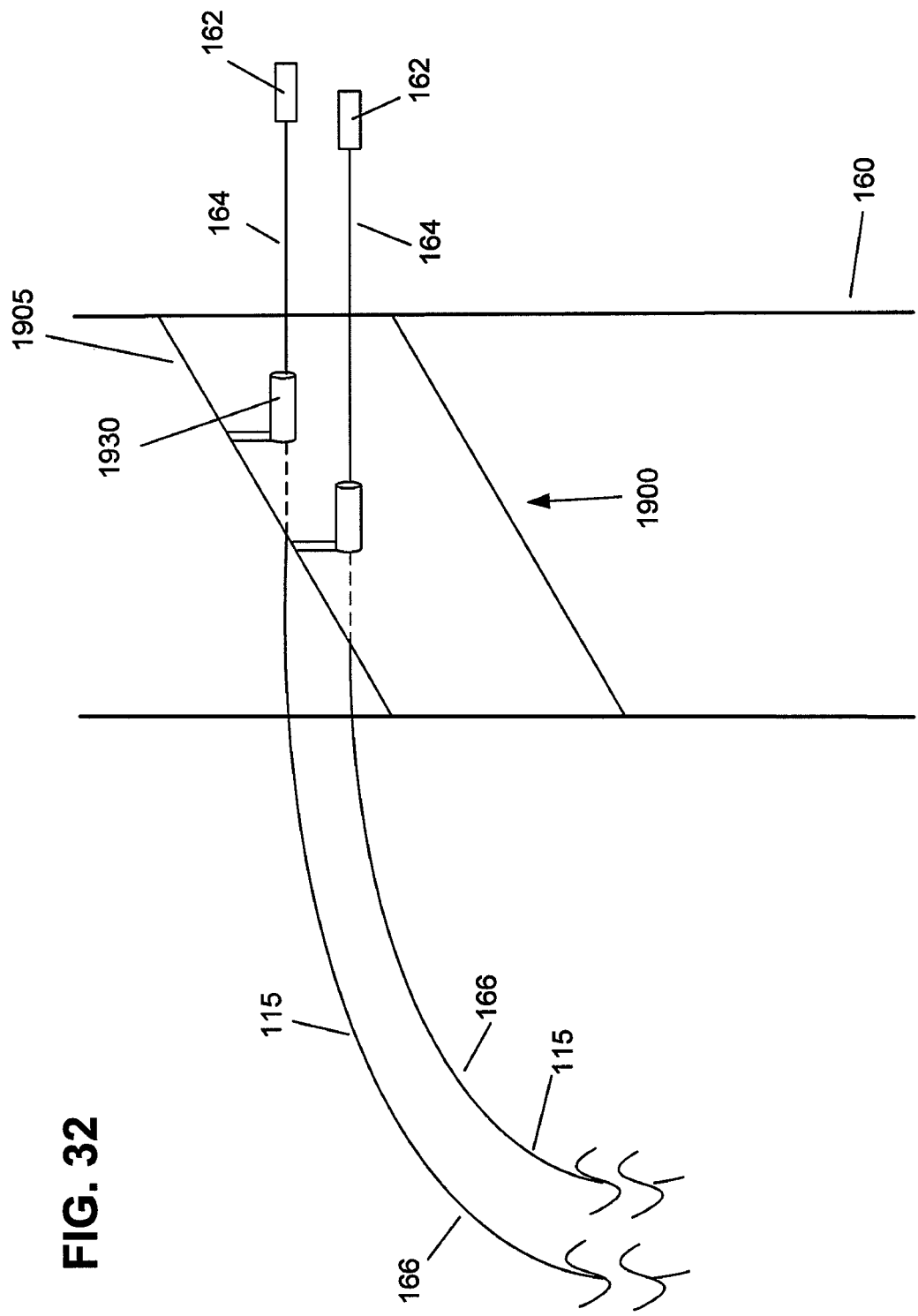
FIG. 32 is a schematic view showing the cable retainer assembly of FIGS. 22-30.

Referring now to FIG. 32, system 1900 is shown mounted to a bulkhead 160 for managing fiber optic cables 115. Holder 1905 holds mated cable retainers 1930 which are spaced from terminated ends 162 of cables 115. Terminated ends 162 typically include fiber optic connectors, such as FC connectors, SC connectors, or LC connectors. Holder 1905 provides cable retention and support of the cable at a location spaced from connectors 162. A first portion 164 of cable 115 is positioned between connectors 162 and holder 1905. A second portion 166 of cable 115 is positioned on an opposite side of the holder 1905. Cable portion 166 does not pull on connector 162 due to retention and support provided by holder 1905.

The preceding embodiments are intended to illustrate without limitation the utility and scope of the present disclosure. Those skilled in the art will readily recognize various modifications and changes that may be made to the embodiments described above without departing from the true spirit and scope of the disclosure.

The claims are:

1. A cable retainer assembly comprising:
a female coupling having a body having a generally cylindrical shape about a first longitudinal axis, the body having an external surface, an internal surface, and a side slot extending longitudinally from a first end opening to an opposite second end opening, the internal surface having a first diameter at the first end opening and a second diameter at the second end opening, wherein the second diameter is smaller than the first diameter;
a male coupling having a body having a generally cylindrical shape about a second longitudinal axis, the body having an external surface, an internal surface, and a side slot extending longitudinally from a first end opening to an opposite second end opening, the external surface defining a shoulder with a diameter larger than the first diameter of the internal surface of the body of the female coupling, the body of the male coupling defining a plurality of flexible projections at one end extending in a direction parallel to the second longitudinal axis and terminating in distal ends;
wherein the second end of the body of the male coupling is inserted into the first end of the body of the female coupling, wherein the distal ends of the projections are movable radially inward as the projections move along the internal surface of the body of the female coupling as the end of the body of the male coupling is moved toward the second end of the body of the female coupling to form a mated cable retainer; and
a holder, wherein the mated cable retainer is coupled to the holder.

2. The cable retainer assembly of claim 1, wherein the female coupling is integrally formed with the holder.

3. The cable retainer assembly of claim 2, wherein a plurality of female couplings are integrally formed with the holder.

4. The cable retainer assembly of claim 1, wherein a circumferential notch is defined on the external surface of the female coupling, and wherein the holder further includes a slotted edge in which the slotted edge is received in the notch of the external surface of the body of the female coupling when the female coupling is moved relative to the holder in a direction transverse to the first longitudinal axis.

5. The cable retainer assembly of claim 4, wherein a closure member is mounted to the holder to retain the female coupling with the holder.

6. The cable retainer assembly of claim 1, wherein the body of the female coupling is positioned on a cable by inserting the cable through a passage defined in the female coupling body such that the female coupling engages the cable as a sleeve fitting.

7. The cable retainer assembly of claim 1, wherein the female coupling is positioned on a cable by pressing the cable lengthwise through the side slot defined in the female coupling body such that the female coupling engages the cable as a sleeve fitting.

8. The cable retainer assembly of claim 1, wherein the male coupling is positioned on a cable by inserting the cable through a passage defined in the male coupling body such that the male coupling engages the cable as a sleeve fitting.

9. The cable retainer assembly of claim 1, wherein the male coupling is positioned on a cable by pressing the cable lengthwise through the side slot defined in the male coupling body such that the male coupling engages the cable as a sleeve fitting.

10. The cable retainer assembly of claim 1, wherein as the distal ends of the flexible projections engage the internal surface of the female coupling and are moved radially inward the male coupling inner diameter is reduced to exert a radial clamping force on the cable to secure the mated retainer to the cable.

11. The cable retainer assembly of claim 1, wherein the holder includes a plate construction.

12. The cable retainer assembly of claim 1, wherein upon forming a mated cable retainer, the male coupling is rotated with respect to the female coupling such that the male coupling side slot is not coincident with the female coupling side slot.

13. The cable retainer assembly of claim 1, wherein a retainment pin is inserted into a retainment aperture in the holder to secure the holder to a bulkhead.

14. The cable retainer assembly of claim 1, wherein the body of the male coupling has a flared shape for the internal surface adjacent to an end opposite to the one end including flexible the projections.

15. A cable management system comprising:
a plurality of fiber optic cables having distal ends terminated by fiber optic connections;
a cable holder positioned spaced from the distal ends, the cable holder including:
a base including a plurality of first members, wherein each first member is slotted between a first end and a second end of the first member in a direction parallel to a longitudinal axis of each first member;
a plurality of second members each slidably received by one of the first members in a direction of the longitudinal axis of the first members, wherein each of the second members is slotted between a first end and a second end of the second member in a direction parallel to a longitudinal axis of each second member;
wherein a selected one of the first and second ends of each second member is received in one of the first and second ends of the first members, wherein the selected end of each of the second members received in the first members is moveable radially inwardly to engage an exterior of one of the fiber optic cables.

* * * * *

UNITED STATES PATENT AND TRADEMARK OFFICE
CERTIFICATE OF CORRECTION

PATENT NO.        : 8,452,151 B2
APPLICATION NO.   : 12/687654
DATED             : May 28, 2013
INVENTOR(S)       : Schroeder et al.

It is certified that error appears in the above-identified patent and that said Letters Patent is hereby corrected as shown below:

In the Claims

Col. 12, line 12, claim 14: "flexible the projections." should read --the flexible projections.--

Signed and Sealed this
Fifth Day of November, 2013

Teresa Stanek Rea
*Deputy Director of the United States Patent and Trademark Office*